June 30, 1942. E. WILDHABER ET AL 2,288,058
MACHINE FOR CUTTING GEARS
Filed June 22, 1938 22 Sheets-Sheet 1

INVENTOR
Ernest Wildhaber and C. T. Galloway
BY
ATTORNEY

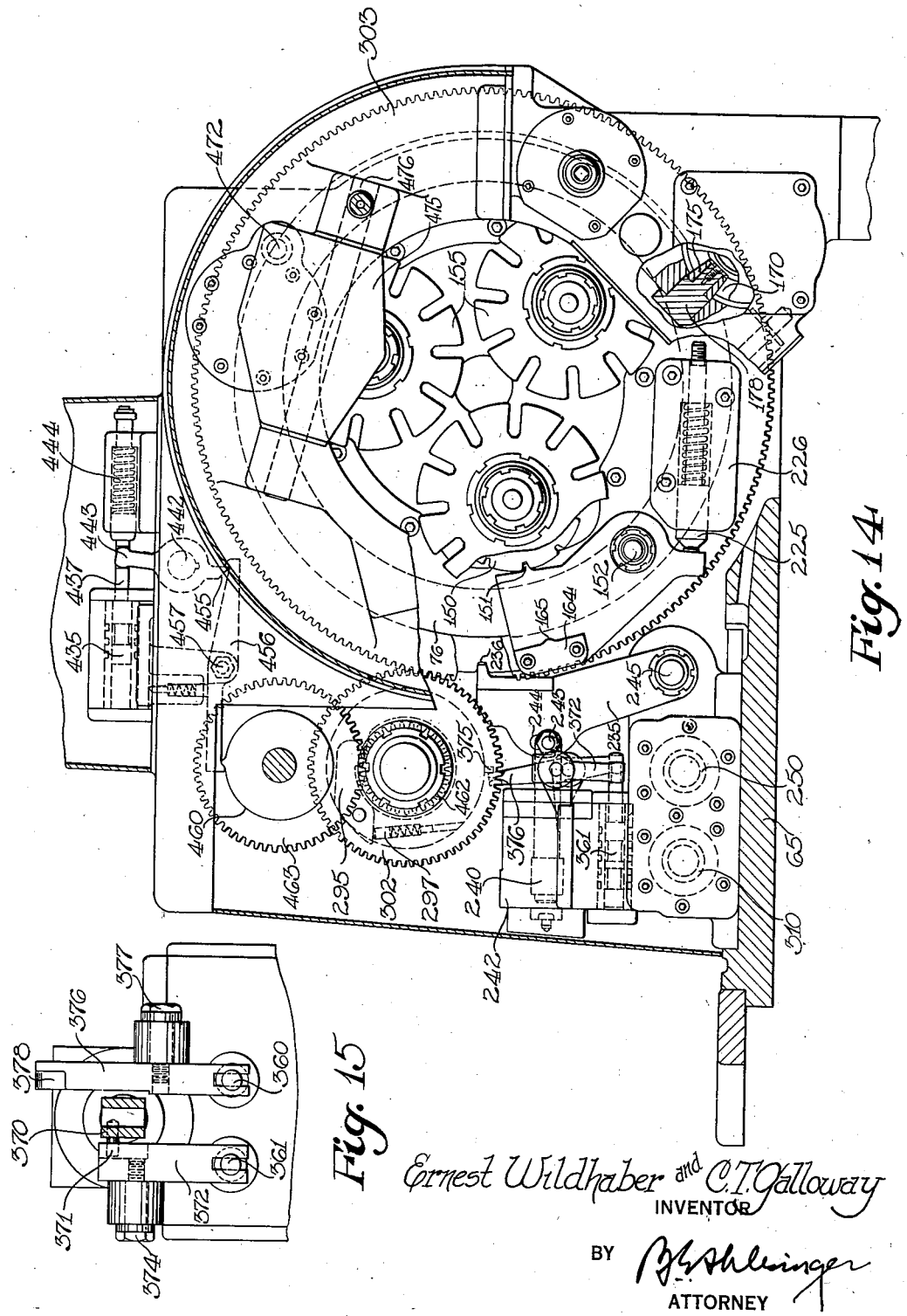

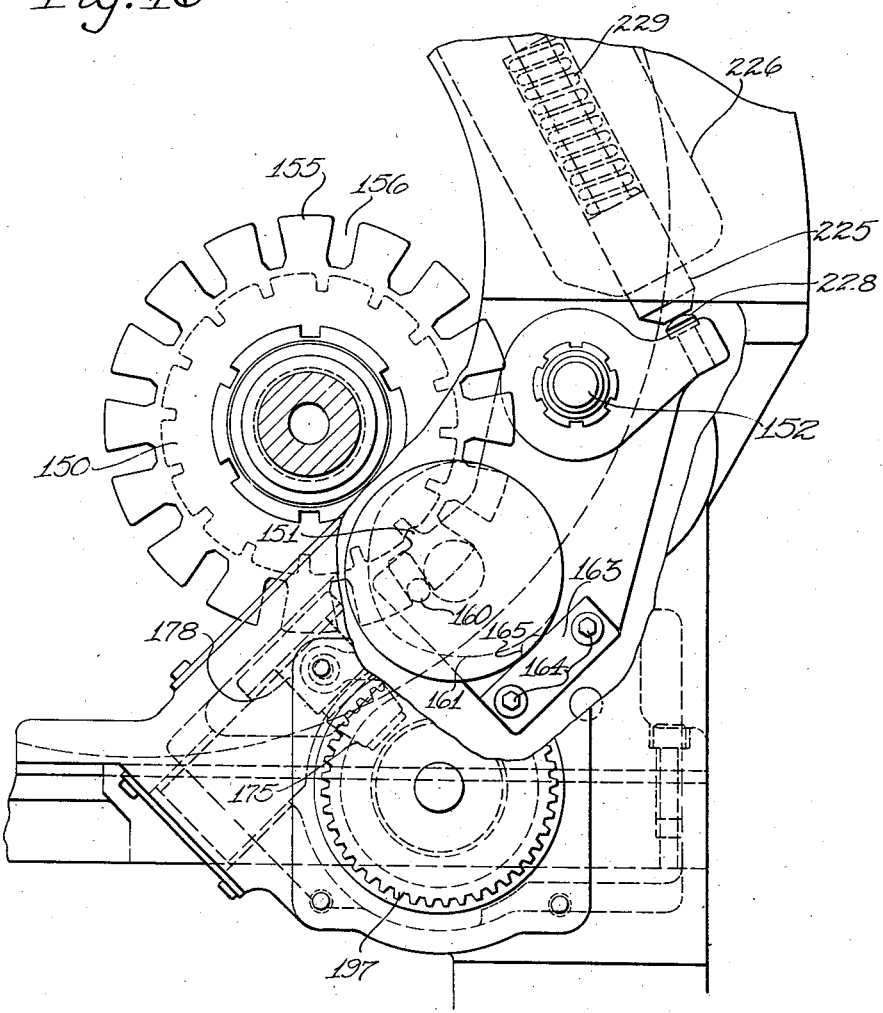

June 30, 1942.    E. WILDHABER ET AL    2,288,058
MACHINE FOR CUTTING GEARS
Filed June 22, 1938    22 Sheets-Sheet 14

Ernest Wildhaber
and C. T. Galloway
INVENTOR
BY
ATTORNEY

June 30, 1942.   E. WILDHABER ET AL   2,288,058
MACHINE FOR CUTTING GEARS
Filed June 22, 1938   22 Sheets-Sheet 15

Ernest Wildhaber and C. T. Galloway
INVENTOR
BY Schlesinger
ATTORNEY

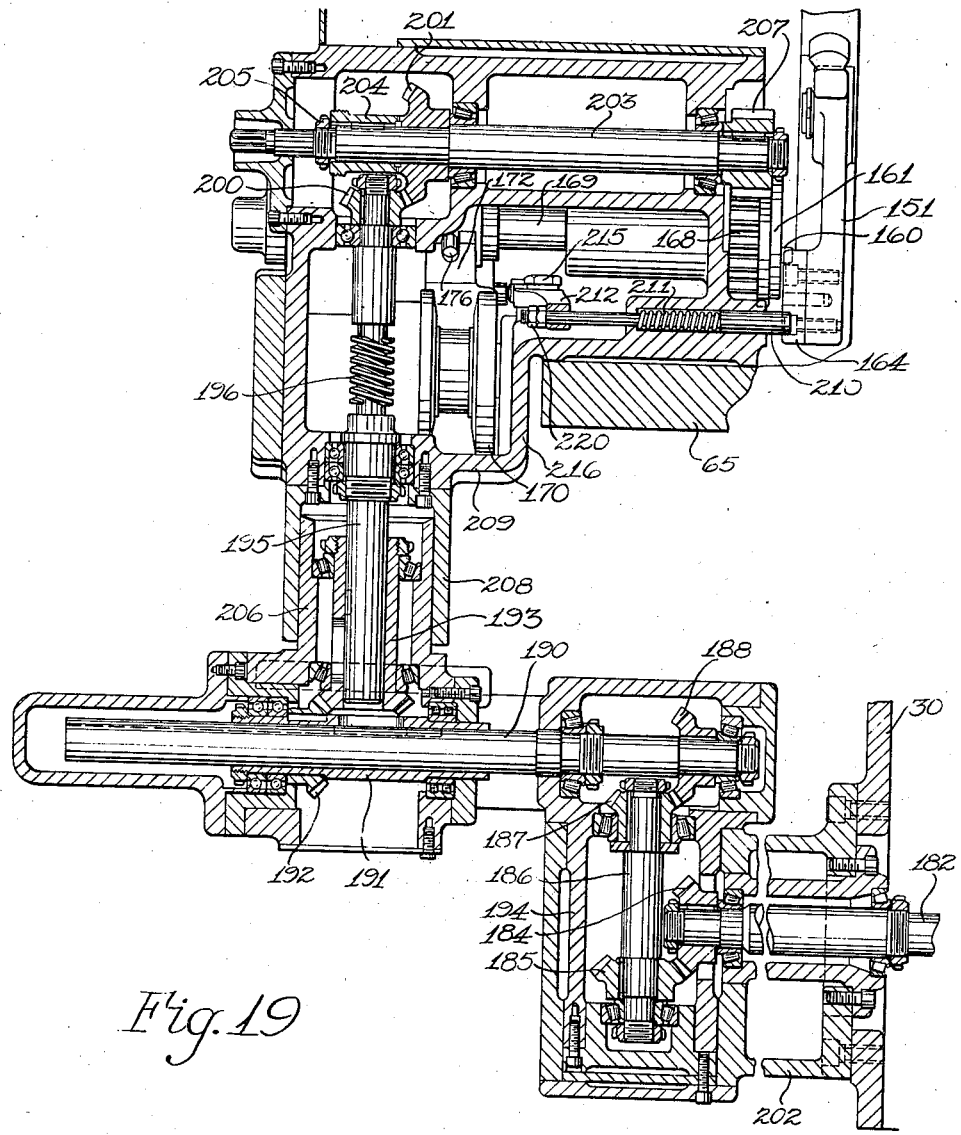

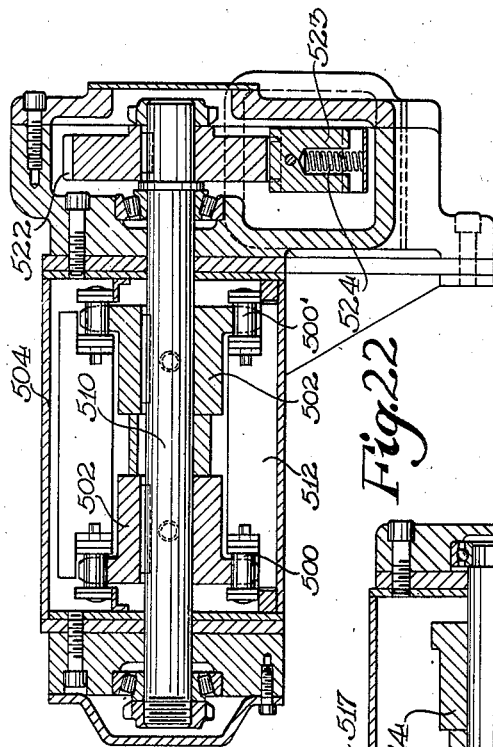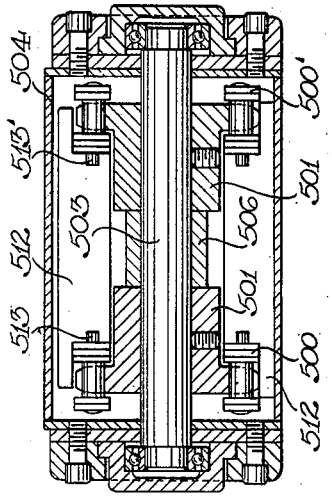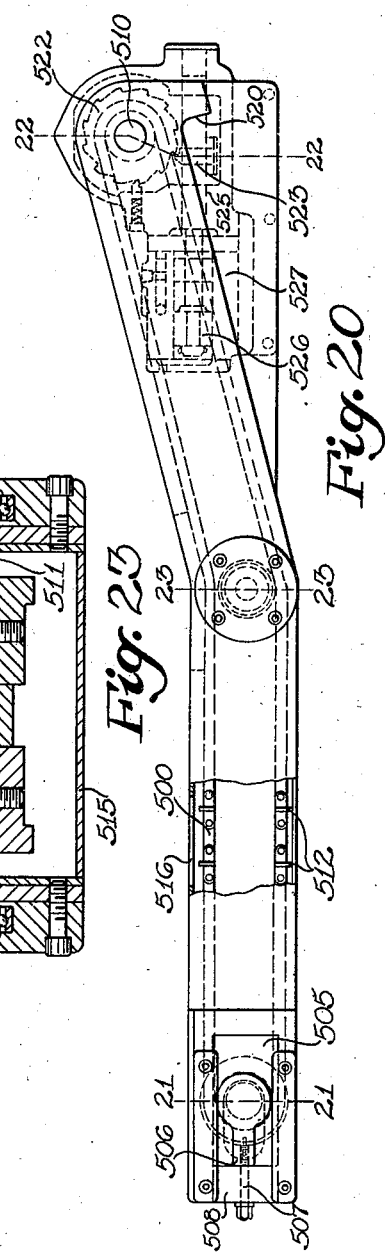

June 30, 1942.  E. WILDHABER ET AL  2,288,058
MACHINE FOR CUTTING GEARS
Filed June 22, 1938  22 Sheets-Sheet 18

Ernest Wildhaber and C. T. Galloway
INVENTOR
BY
ATTORNEY

June 30, 1942. E. WILDHABER ET AL 2,288,058
MACHINE FOR CUTTING GEARS
Filed June 22, 1938    22 Sheets-Sheet 20

Ernest Wildhaber and C. T. Galloway
INVENTOR
BY  B. E. Shlesinger
ATTORNEY

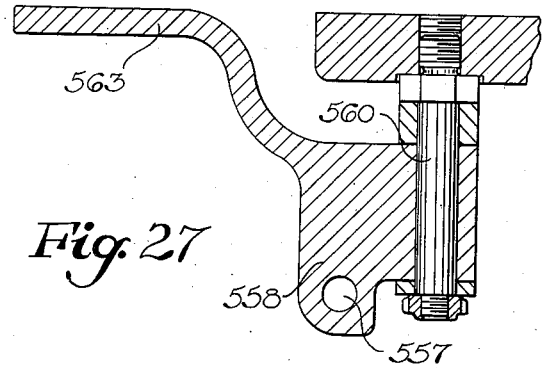
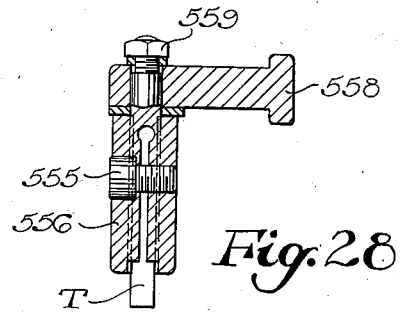
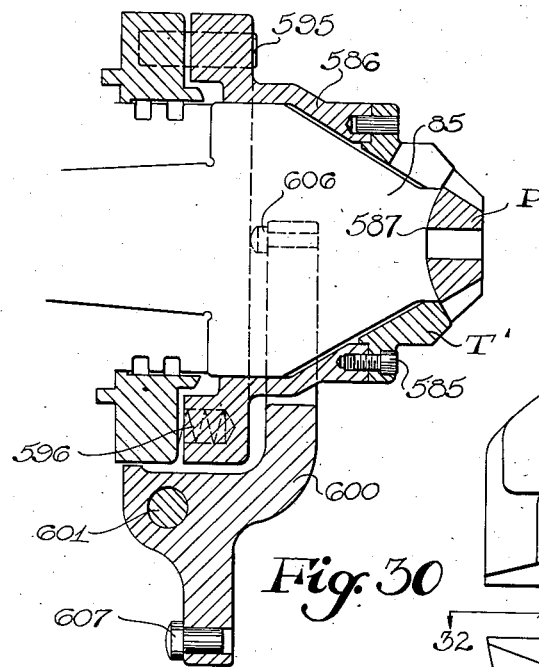
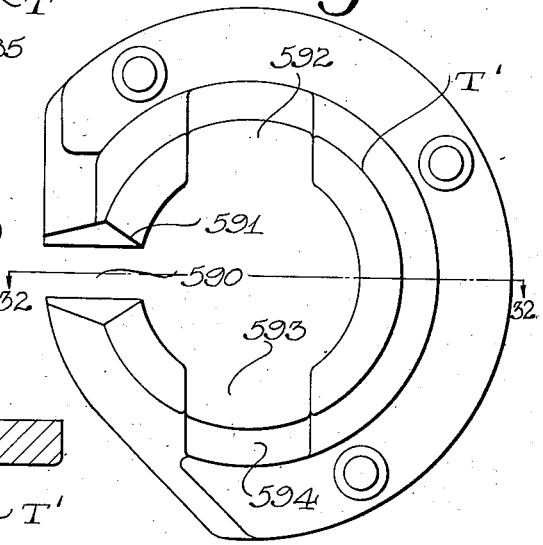
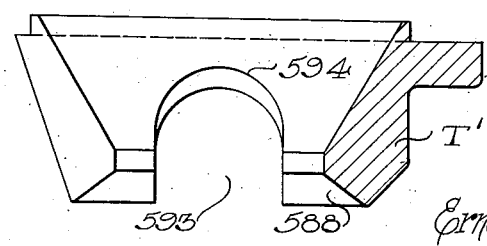

Patented June 30, 1942

2,288,058

UNITED STATES PATENT OFFICE 2,288,058

MACHINE FOR CUTTING GEARS

Ernest Wildhaber, Irondequoit, and Clarence T. Galloway, Rochester, N. Y., assignors to Gleason Works, Rochester, N. Y., a corporation of New York Application June 22, 1938, Serial No. 215,188

25 Claims. (Cl. 90—9)

The present invention relates to machines for producing gears and in particular to machines for producing straight toothed bevel gears. In a still more specific aspect, the invention relates to machines for producing gears according to the methods described in the copending applications of Ernest Wildhaber, Serial Nos. 164,340 and 181,177, filed September 17, 1937 and December 22, 1937, respectively.

One specific embodiment of the invention is illustrated in the accompanying drawings in which:

Fig. 13 is a view showing certain details of the turret drive;

Fig. 14 is a view looking at the back of the work head and turret, parts being broken away;

Fig. 15 is a fragmentary view showing details of the parts for operating the pilot valves which control the operation of the turret;

Fig. 16 is a fragmentary view on an enlarged scale showing details of the mechanism for indexing the work spindles of the machine;

Fig. 19 is a view on a smaller scale showing further details of the drive to the index mechanism and the parts for actuating the same;

Fig. 20 is a side elevation with parts broken away, showing the chip conveyor of the machine;

Fig. 21 is a section on the line 21—21 of Fig. 20 on an enlarged scale;

Fig. 22 is a section on the line 22—22 of Fig. 20 and Fig. 23 is a section on the line 23—23 of Fig. 20, these figures being on the same scale as Fig. 21;

Fig. 27 is a section on the line 27—27 of Fig. 26;

Fig. 28 is a section on the line 28—28 of Fig. 26;

Fig. 30 is a section on the line 30—30 of Fig. 29;

Fig. 31 is a front elevation of the burr-removing tool shown in Figs. 29 and 30; and Fig. 32 is a section on the line 32—32 of Fig. 31.

Figure 1:
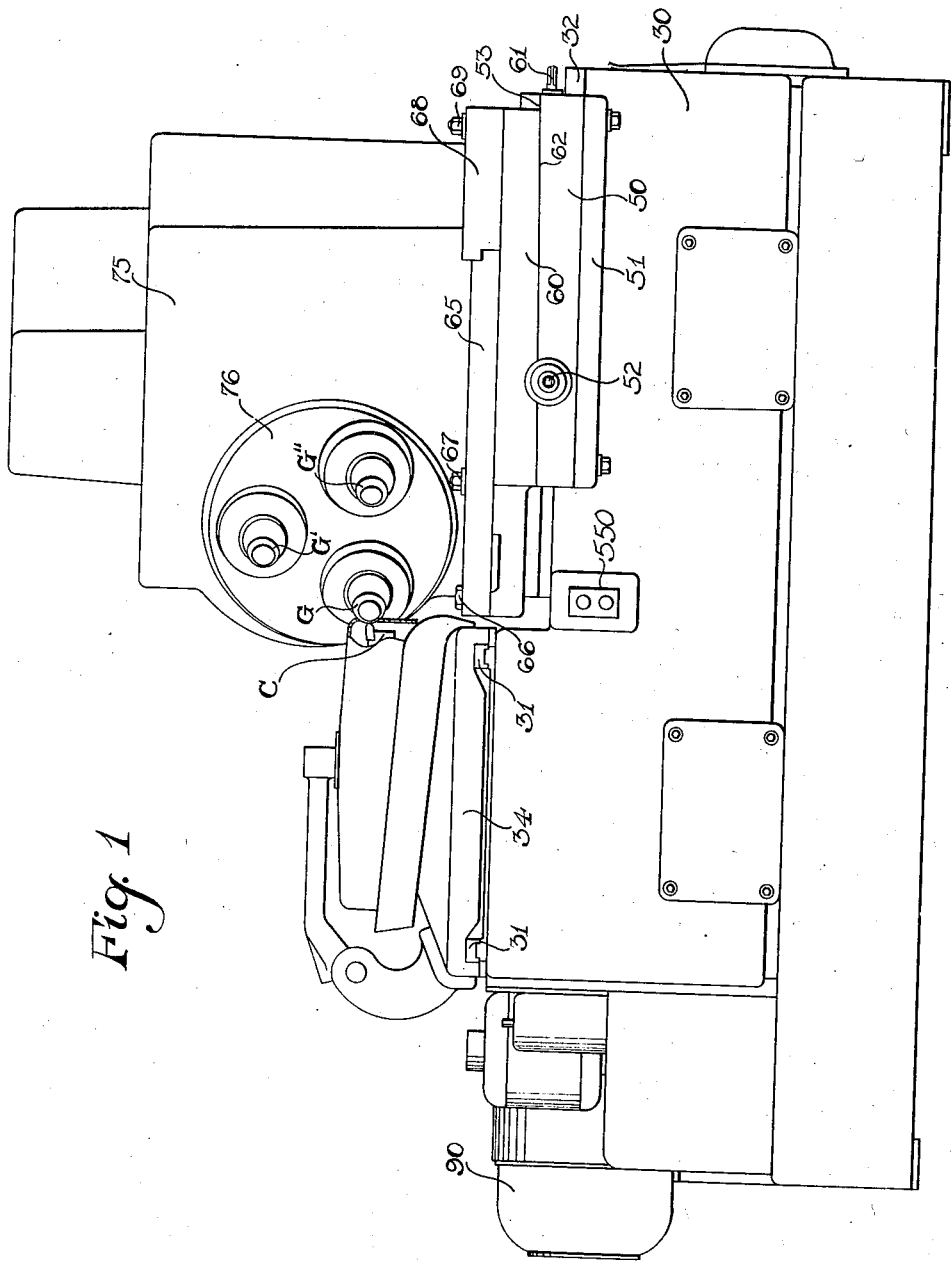
Fig. 1 is a side elevation of a machine built according to a preferred embodiment of the invention.

The primary purpose of the present invention is to provide a machine for cutting gears which will be extremely fast in operation. Since this object is realized by employment of the methods of gear cutting which are described in the Wildhaber applications above mentioned, it seems advisable first briefly to recapitulate the basic principles of these methods of gear cutting. In either process, a disc milling cutter of large diameter is employed which has a plurality of cutting blades arranged part-way only around its periphery with a gap between the last and first blades. The number of cutting blades provided in the cutter is sufficient to complete the cutting of a tooth space of a gear blank in one revolution of the cutter. The blades may be all roughing blades and the cutter employed for rough-cutting only, or the blades may be all finishing blades and the cutter employed for finishing only, or the blades may be arranged in two groups, one group comprising roughing blades and the other group comprising finishing blades. In this last case, a tooth space may be roughed and finished from the solid in one revolution of the cutter.

The different blades of the cutter are shaped to cut at different points along the length of a tooth space of the gear blank to be cut. For bevel gears, this means that one blade is shaped to cut at the large end of a tooth space of the blank, another blade is shaped to cut at the small end of the tooth space and intermediate blades are shaped to cut at points intermediate the large and small ends of the space.

In operation, the cutter is positioned relative to the gear blank to be cut so that it will cut to the full depth of the tooth spaces of the blank without further depthwise feed and then the cutter is fed lengthwise of the tooth space of the blank as it rotates on its axis. The cutter rotation is so timed to this lengthwise feed movement that the different blades of the cutter will cut at the proper points along the length of the tooth space. The blank is held stationary during cutting, but is indexed when the gap in the cutter is abreast of the blank.

The cutter may cut during feed in one direction only or during feed in both directions. In the latter case, the work is indexed at the end of the return feed movement. In either event, when the cutter has made as many revolutions as there are tooth spaces in the gear blank to be cut, the cutting operation on the blank will be finished.

In order that the cutting process may be carried on with a maximum of efficiency and with a minimum of idle time, it is preferred to build the machine as illustrated in the drawings with a rotary work turret which will permit of additional gear blanks being chucked while one is being cut. In the machine illustrated in the drawings, the turret carries three work spindles. When one work spindle is at the cutting station, the other two spindles are at loading stations, permitting two gear blanks to be chucked while one is being cut. This enables a single operator to take care of several machines simultaneously.

Means is provided to index the turret automatically at the end of the cutting operation on a gear blank. To prevent damage to the machine, the turret indexing mechanism and the cutting mechanism are interlocked. The turret indexing mechanism is hydraulically operated while the cutting mechanism is mechanically operated. Means is provided, however, which is driven in time with the cutting mechanism which prevents operation of the turret actuating mechanism until all of the tooth spaces of a gear blank have been cut, until the cutter is at the end of its return stroke, until the gap in the cutter is abreast of the blank, and until the cutter and cutter feed mechanism are stopped. Likewise means is provided which is actuated from the turret indexing mechanism which prevents restarting of the cutter and cutter-feed mechanism until the turret index has been completed.

The indexing of the work periodically during the cutting of a gear blank is effected from an indexing mechanism of the notched plate type which as above indicated is driven in time with the cutter rotation. There is a notched plate with a locking dog associated with each work spindle and as each work spindle is indexed into cutting position by rotation of the turret, the particular notched plate and locking dog for that spindle is brought into registry with an index actuating mechanism which is mounted on a relatively fixed position on the machine. This index actuating mechanism serves periodically to disengage the locking dog, rotate the work spindle and relock it again once on each revolution of the cutter, namely, when the gap in the cutter is abreast of the gear blank being cut.

Chucking mechanism is associated with each work spindle. The chucking mechanism is preferably of the spring loaded type and is constantly urged into chucking position. For releasing the chucking mechanism, there are a pair of hydraulically-operated chuck-release levers mounted on a relatively fixed part of the machine. These chuck-release levers are so positioned as to register with the two work spindles which are at the loading stations. When a spindle registers with the chuck release lever, the chucking mechanism is automatically moved to released position. It remains in that position until a new gear blank has been chucked. The machine is so arranged that the operator will ordinarily wait until two work spindles are at the two loading stations with work pieces dechucked, before removing the completed gears from those work spindles and chucking new blanks thereon. Thus the turret is ordinarily indexed twice before the completed gears are removed and new blanks chucked.

Two paddles or arms are provided. These are mounted upon a relatively fixed part of the machine and are adapted to be swung down in front of the gear blanks to insure that the blanks have been properly chucked. Means is provided, associated with these paddles, to insure that the turret is not indexed a third time in succession unless two blanks have been properly chucked upon the two spindles which are at the two loading stations. An automatic trip mechanism throws the two paddles up out of operative position when the turret is indexed. This trip mechanism is operated from the drive to the turret.

Because of the very high productive capacity of the machine, it is necessary to provide means for automatically removing the chips from the machine. Hand-removal would be too burdensome a task. A conveyer mechanism is provided which is operated automatically and hydraulically in time with the other hydraulic operations of the machine.

The usual adjustments are provided for positioning the gear blank to be cut in proper operating position and in addition an adjustment is provided for offsetting the axis of the gear blank to be cut from the plane of rotation of the cutter. This permits of control of the position of the tooth bearing on the gears being cut.

Figure 2:
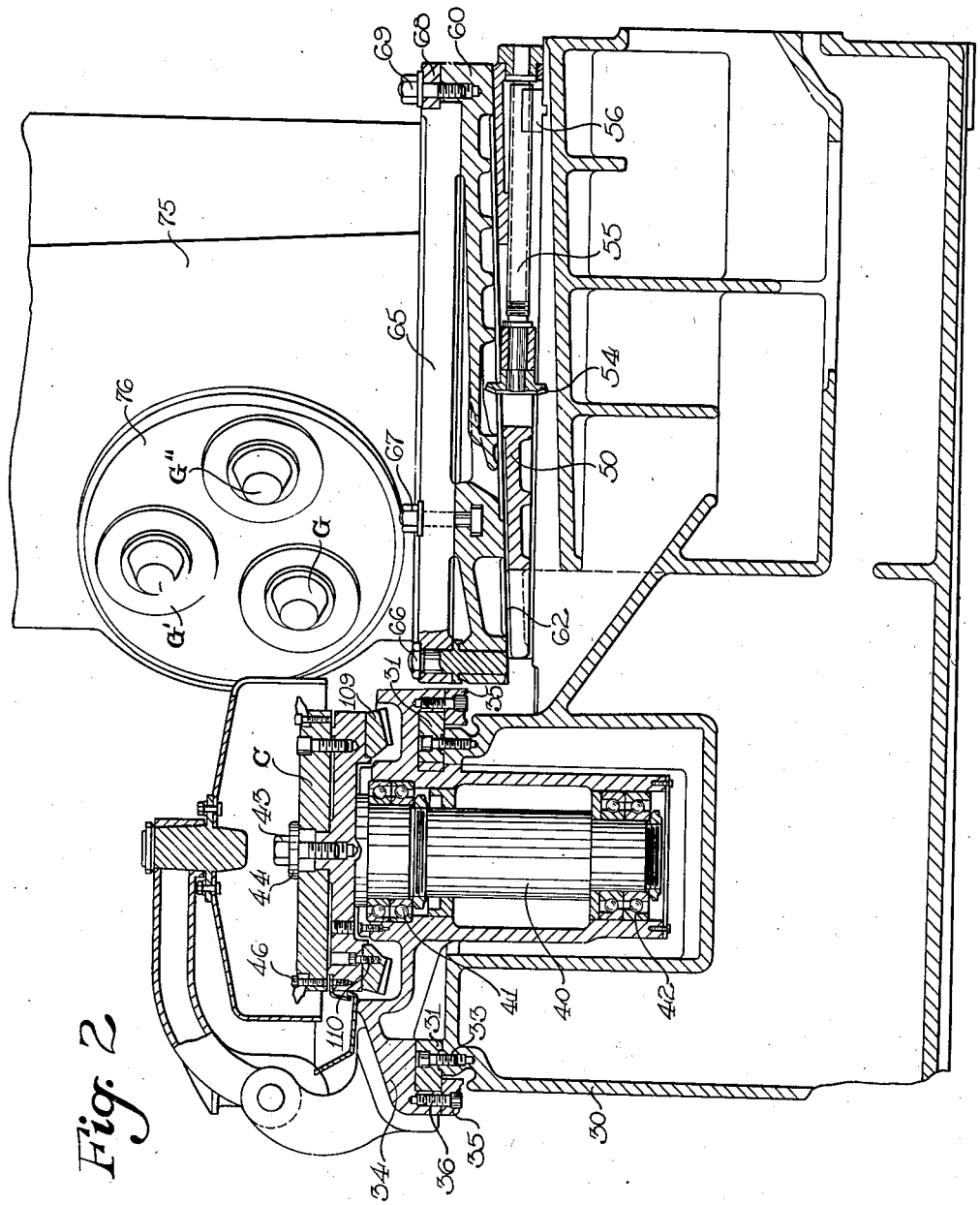
Fig. 2 is a view of this machine looking in the same direction as Fig. 1, but on a slightly enlarged scale and with parts broken away.
Figure 3:
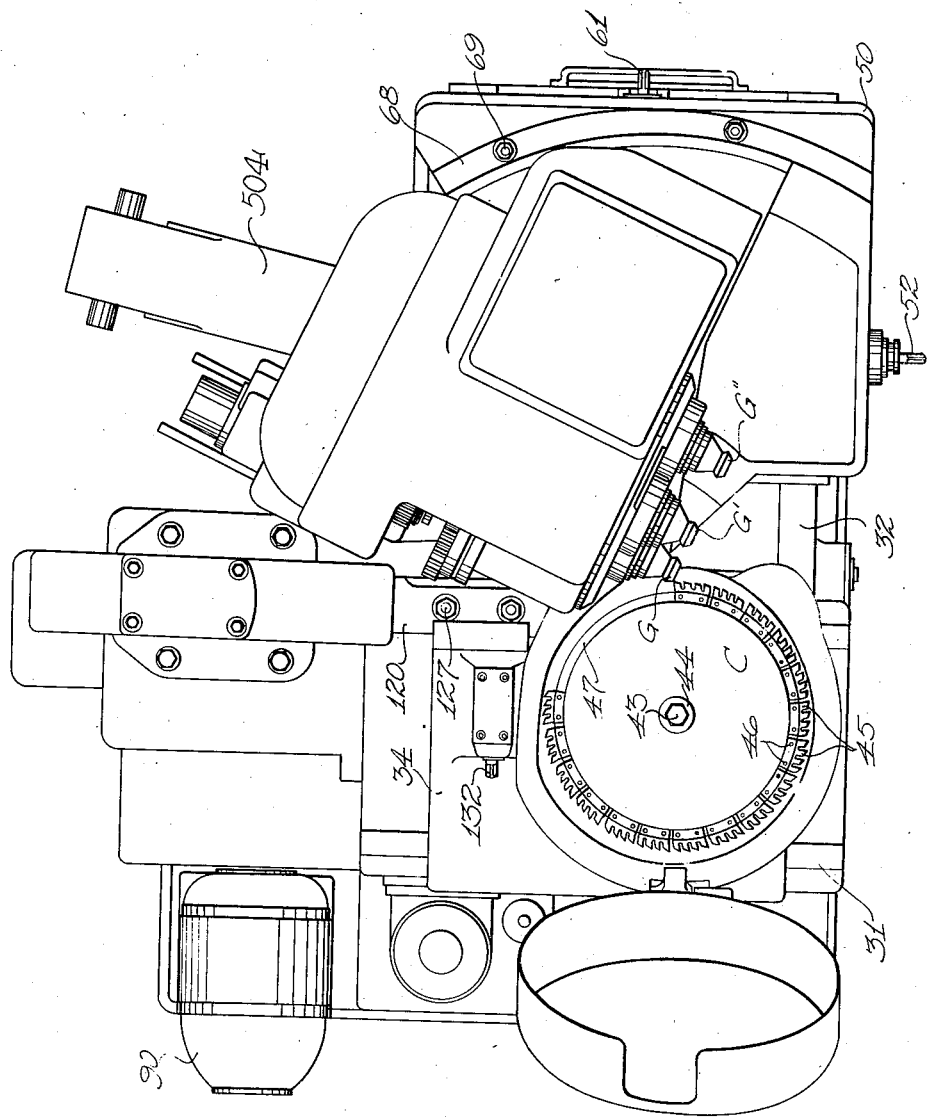
Fig. 3 is a plan view of the machine.

Reference will now be had to the drawings for a more detailed description of the invention. 30 denotes the base or bed of the machine. The upper face of the bed 30 is provided with two pairs of spaced ways, designated respectively at 31 and 32 (Figs. 1, 2 and 3). The ways 31 extend at right angles to the ways 32. The ways 31 are fastened to the bed 30 by screws 33 while the ways 32 are integral with the bed.

Mounted to slide upon the ways 31 is a cutter carriage 34. The carriage 34 is held on the ways 31 by gibs 35 which are secured to the carriage by screws 36.

Figure 5:
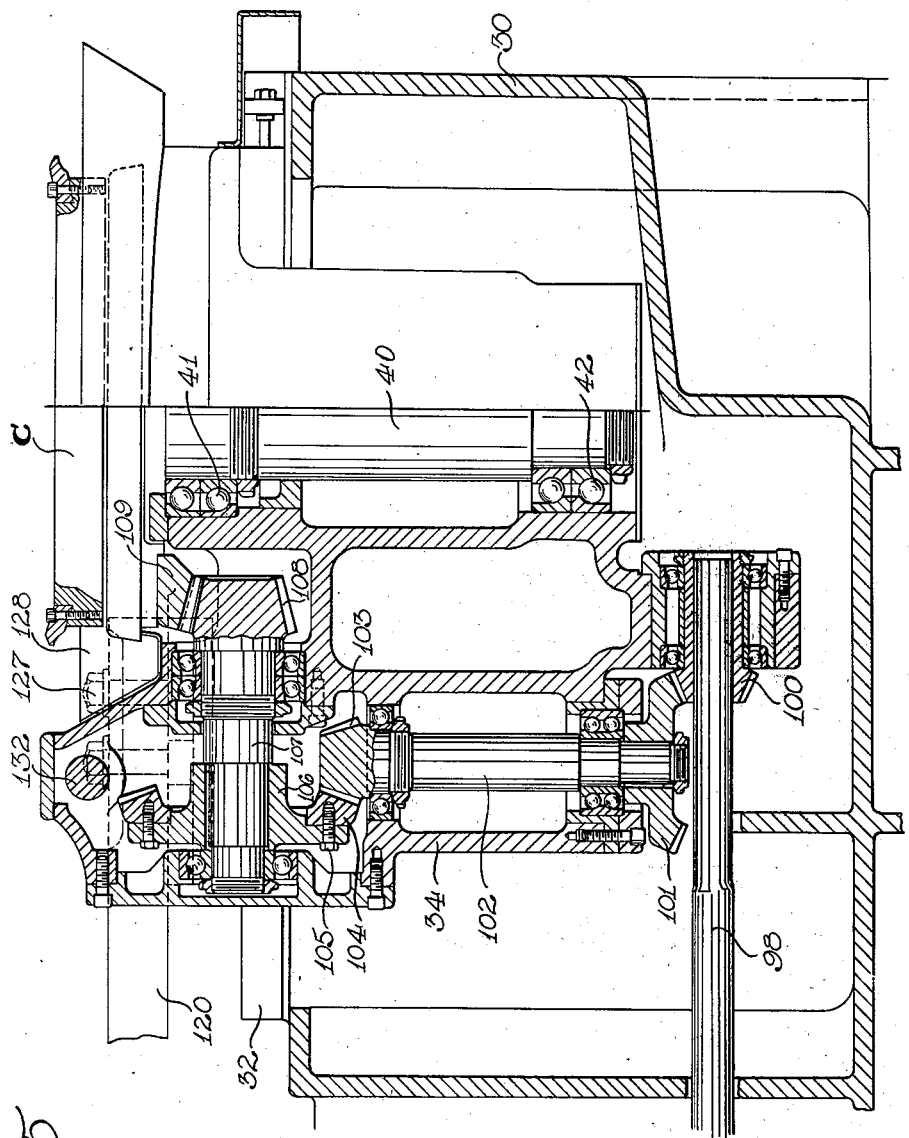
Fig. 5 is a fragmentary view on an enlarged scale showing details of the drive to the cutting tool.

The cutter spindle 40 of the machine is journaled in the carriage 34 on sets of anti-friction bearings 41 and 42 (Figs. 2 and 5). The cutter C is secured to the upper end of this spindle by a bolt 43 and plate 44. The cutter C is made preferably according to the principles of the Wildhaber applications above mentioned. It has a plurality of cutting segments 45 (Fig. 3) secured on its periphery by screws 46. These segments extend part-way only around the periphery of the cutter and there is a gap 47, as shown in Fig. 3, between the last and the first segments which is of sufficient angular extent to permit of indexing a gear blank when the gap is abreast of the blank without withdrawal of the cutter from engagement with the blank.

The side cutting edges of the segments are of concave profile shape as clearly illustrated in Figs. 2 and 5 for cutting tooth surfaces of convex profile curvature on the gears to be produced. Preferably the profiles of the cutting edges are of circular arcuate shape according to the principles of the Wildhaber application above mentioned. For bevel gears they may be made of changing radii according to the principles of application No. 164,340 or they may be made with the same radii of curvature but with their centers displaced from one another according to the principles of application No. 181,177. Either construction permits of cutting tooth surfaces on bevel gears which vary in profile shape from end to end in accordance with the desired lengthwise taper in shape of the gear teeth.

Mounted for sliding adjustment upon the ways 32 of the bed is a sliding base 50. This sliding base is held on the ways 32 by gibs 51 (Fig. 1). The sliding base 50 is adjusted by rotation of a shaft 52 which is journaled in the sliding base and to which is secured a bevel pinion (not shown) that meshes with the bevel gear 54 (Fig. 2). This bevel gear 54 is secured to a screw shaft 55 which threads into a half nut 56 that is secured to the bed of the machine. By rotation of the shaft 52, then, the sliding base 50 may be adjusted on the bed of the machine.

The sliding base 50 is formed with an inclined upper face 53.

Mounted upon the sliding base is a plate 60 which has an inclined lower face 62 complementary to the upper face of the sliding base. The plate 60 may be adjusted on the base 50 in the direction of adjustment of the base 50 by rotating a shaft 61 (Figs. 1 and 3). This shaft is journaled in the plate 60 and threads into a nut (not shown) that is secured to the base 50.

Mounted on the plate 60 for angular adjustment thereon is the work head or support 65. This head is adapted to be adjusted angularly about the axis of a stud 66 which is mounted in the plate 60 and is secured to the support 65. The support 65 is secured in any position of its angular adjustment on the plate 60 by the T-bolts 67 (Fig. 2) and by the gib 68 and screws 69 (Figs. 2 and 3). The T-bolts 67 engage in an arcuate T-slot 70 (Fig. 11) formed in the upper face of the plate 60.

Mounted upon the angularly adjustable head 65 and secured thereto in any suitable manner is the turret housing 75. The turret 76 is rotatably journaled in this housing.

There are three work spindles 80 (Fig. 11) rotatably mounted in the turret and spaced 120° apart. Each work spindle 80 is mounted upon a pair of spaced roller bearings 81 which are separated by a spacer sleeve 82.

Mounted in each spindle is an arbor 83 which is secured in the spindle by screws 84. The gear blank, which is to be cut, is secured to the arbor by any suitable type of chucking mechanism. In the drawings, the chucking mechanism comprises a split-collet 85 of standard construction and a draw-bar 86 having a conical outer end or head to cooperate with the collet. The draw-bar is normally actuated into chucking position by a coil spring 87 which is interposed between the inner end of the arbor 83 and a nut 88 which is threaded onto the inner end of the draw-bar.

The turret is so mounted and operated that the work spindles are successively indexed into operating position by indexing the turret and that when one work spindle is at the cutting station, the other two spindles will be out of operating position at loading stations so that gear blanks may readily be chucked thereon. For the sake of clearness, the gear blank which is at the cutting station in the drawings is denoted at G and the other two blanks are designated G' and G'', respectively.

*Drive to cutter*

Figure 24:
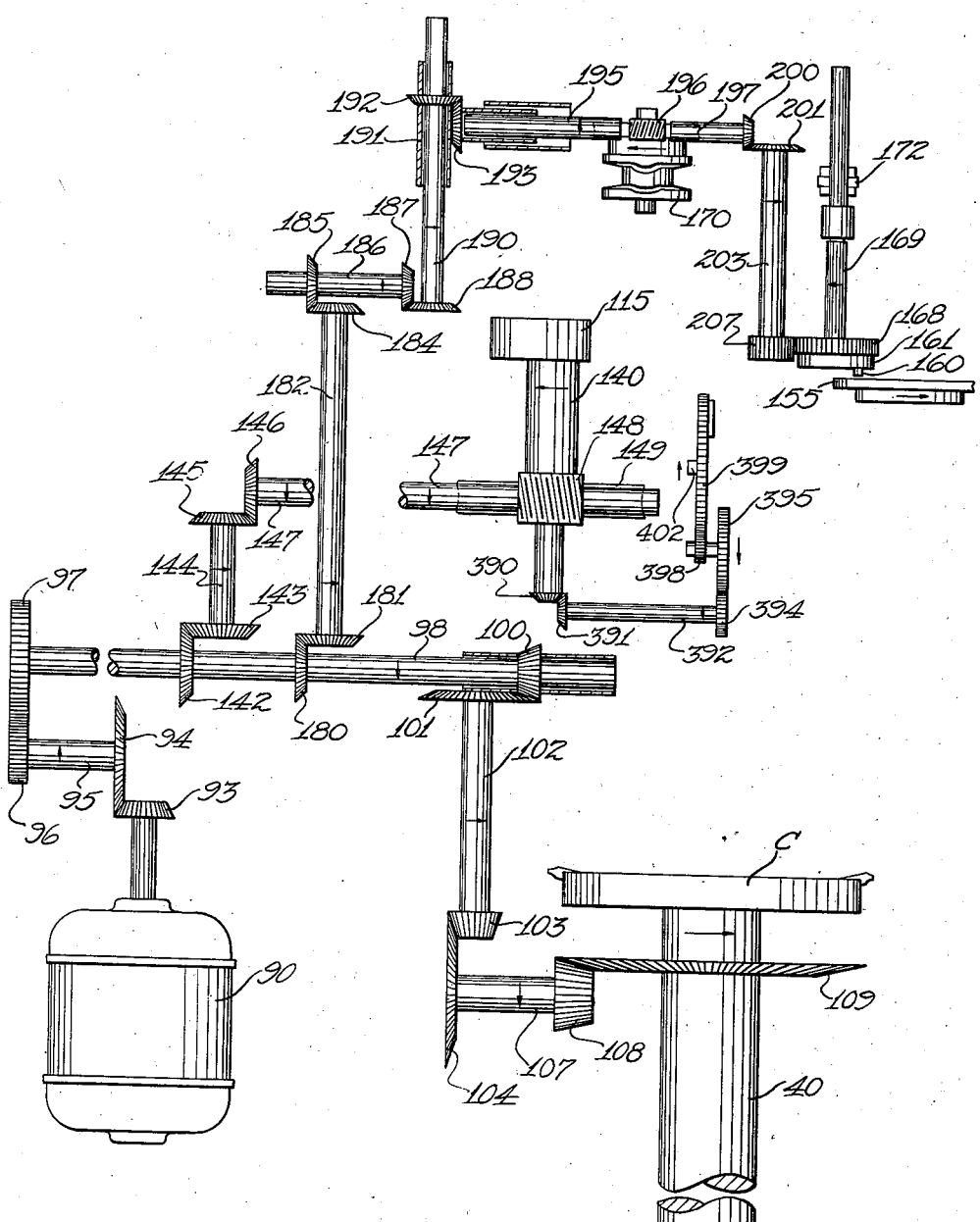
Fig. 24 is a drive diagram, showing the mechanical operating mechanism of the machine.

During the cutting of a gear blank, the cutter is rotated continuously on its axis. The cutter is driven from a motor 90 (Figs. 1 and 24). The armature shaft 91 (Fig. 7) of the motor is connected by a standard coupling 92 to a bevel pinion 93 which meshes with a bevel gear 94 (Figs. 6 and 24) that is keyed to a shaft 95. There is a spur pinion 96 (Figs. 6, 7 and 24) keyed to the outer end of the shaft 95 and this pinion meshes with a spur gear 97 that is keyed to an elongated splined shaft 98. The shaft 98 has a sliding splined connection at one end with a bevel pinion 100 (Figs. 5 and 24). This pinion meshes with a bevel gear 101 which is keyed to the lower end of a shaft 102. Integral with the shaft 102 is a bevel pinion 103. This pinion meshes with a bevel gear 104 which is secured by means of screws 105 to a sleeve 106 that is keyed to a shaft 107. There is a bevel pinion 108 integral with the shaft 107. This bevel pinion meshes with a bevel gear 109 (Figs. 2, 5 and 24) that is secured by means of screws 110 to the head of the cutter spindle 40.

The bevel pinion 93 and the shafts 95 and 98 are journaled on suitable anti-friction bearings in the bed 30 of the machine. The bevel pinion 100 and the shafts 102 and 107 are journaled on suitable anti-friction bearings in the carriage 34 in which the cutter spindle 40 is journaled.

*Mechanism for reciprocating cutter and cutting principle*

Figure 6:
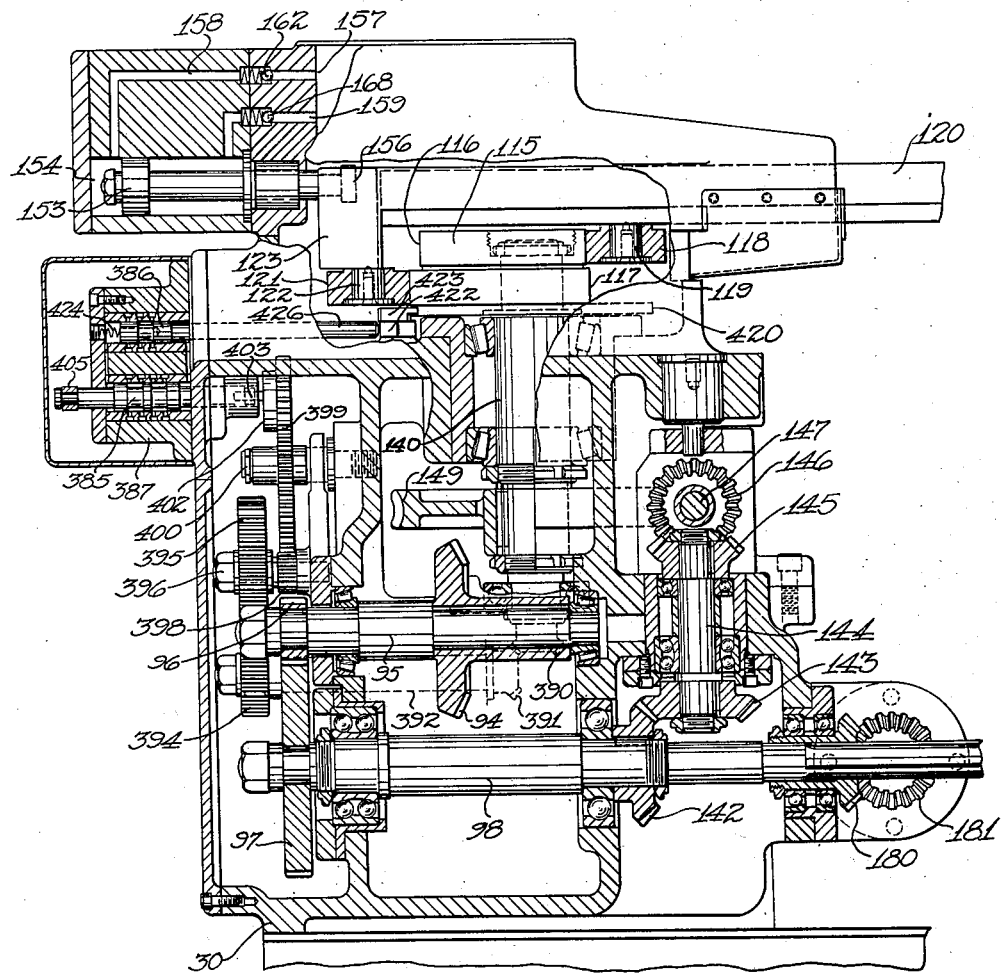
Fig. 6 is a broken-away view of the feed control bracket showing details of the mechanism for producing the reciprocating movement of the cutter lengthwise of the gear tooth to be cut.
Figure 8:
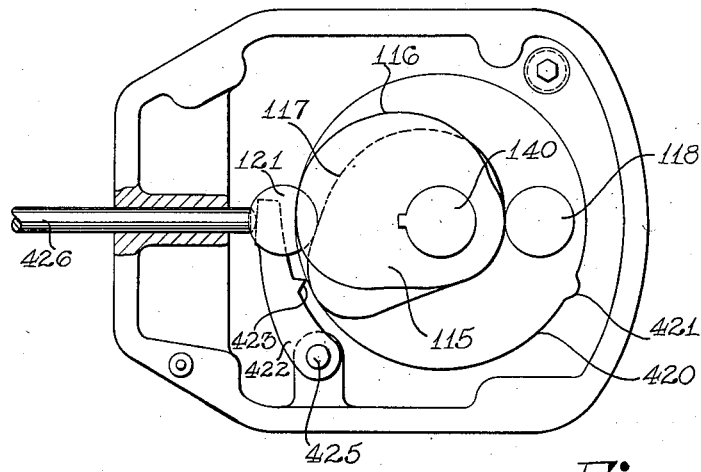
Fig. 8 is a detail view showing the feed cam and associated parts in plan.

The reciprocatory movement of the carriage 34 for moving the cutter longitudinally of the gear teeth of the blank to be cut is imparted to the carriage 34 by a rotary cam 115 (Figs. 6, 8 and 24). This cam is formed with two track ways 116 and 117, one above the other. The track-way 116 engages a roller 118 which is journaled on the stud 119 that is secured to the under face of a bar 120. The track-way 117 engages a roller 121 which is journaled on a stud 122 that is secured to the underface of an arm or projection 123 formed on the bar 120.

Figure 9:
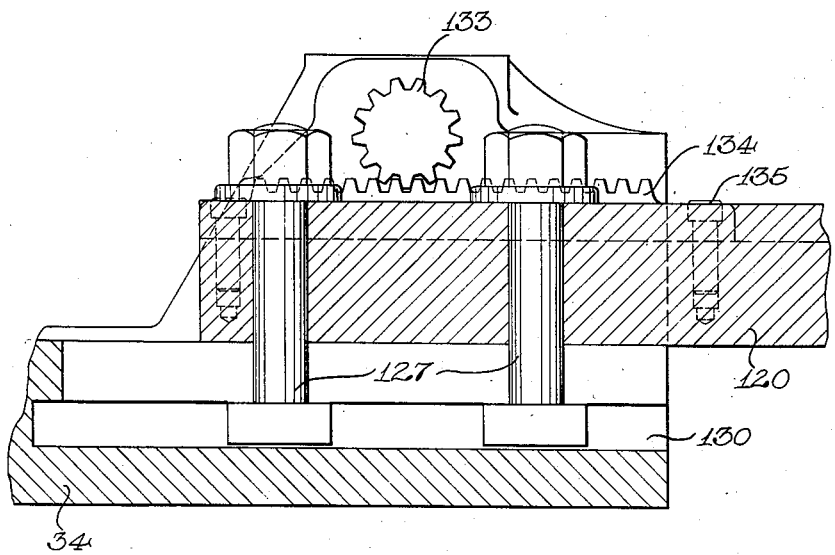
Fig. 9 is a fragmentary sectional view showing the details of the adjustable connection between the feed bar and the cutter slide.

The bar 120 is adjustably connected by means of T-bolts 127 (Figs. 3, 5 and 9) to the upper face of the carriage 34. The T-bolts engage in a T-slot 130 formed in the upper face of the carriage. When the T-bolts are loosened, the connection between the bar 120 and the carriage 34 can be adjusted to permit of adjustment of the position of stroke of the carriage. This adjustment may be effected by rotation of the shaft 132 (Figs. 3, 5 and 9) which is journaled in the carriage and which carries a pinion 133 that meshes with a rack 134 which is secured by screws 135 to the bar 120.

The double-track cam 115 is keyed to a shaft 140 (Figs. 6, 8 and 24) which is journaled on suitable anti-friction bearings in the bed 30 of the machine. This shaft is driven from the elongated splined shaft 98 through the bevel gear 142 which is keyed to the shaft 98, the bevel gear 143 that meshes therewith, the shaft 144 to which the bevel gear 143 is keyed, the bevel gear 145 which is keyed to the shaft 144, the bevel gear 146 which is secured to the shaft 147, a worm 148 which is also secured to this shaft and a worm wheel 149 which is keyed to the shaft 140. Thus the cam 115 is driven in timed relation with the rotation of the cutter spindle 40 to impart a reciprocating feed movement to the carriage 34 in time with the rotation of the cutter C. The feed movement of the carriage moves the cutter from one end of the tooth slot to the other to cut a tooth slot for its full length on each revolution of the cutter.

Figure 4:
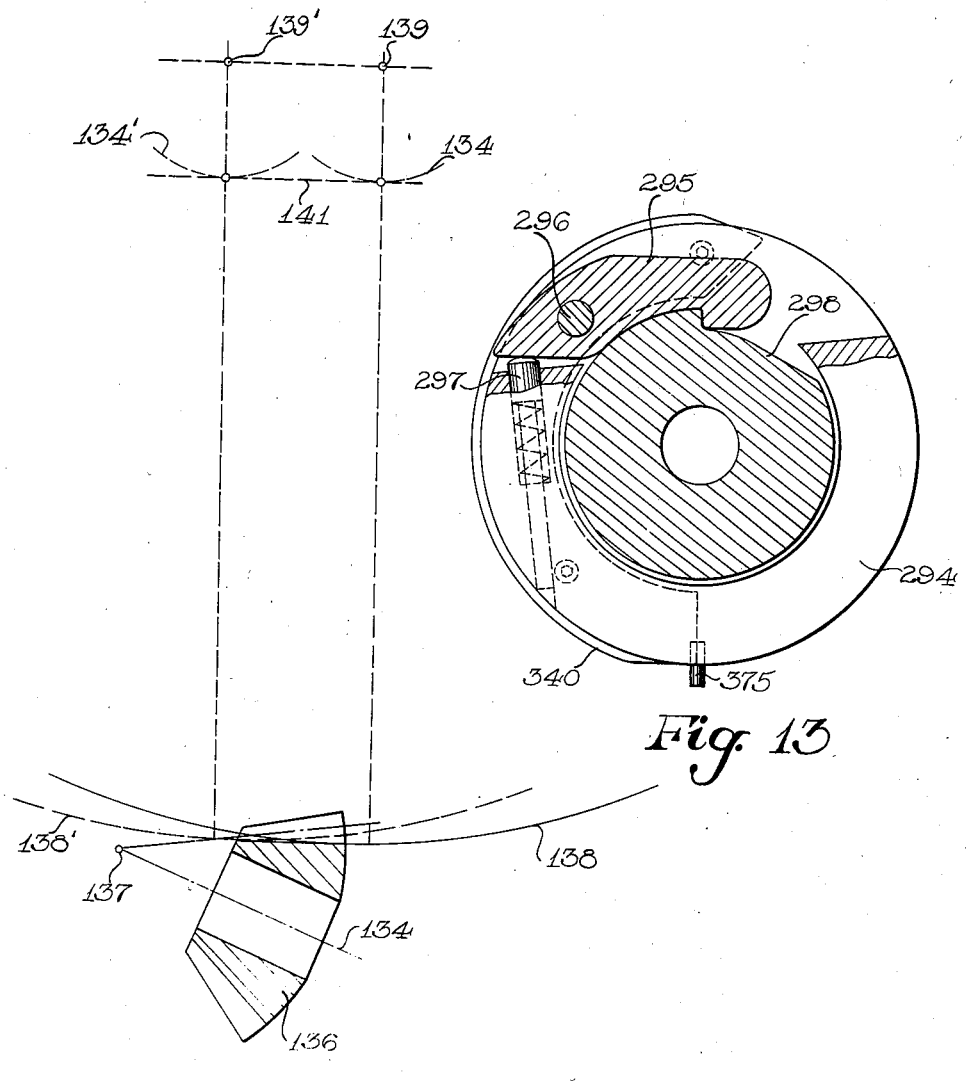
Fig. 4 is a diagrammatic view illustrating the cutting principle employed in the machine.

The principle of cutting is clearly illustrated in Fig. 4. 136 denotes the bevel gear blank to be cut. 134 is its axis and 137 its apex. The circular arc 138 denotes a position of the cutter near one end of its feed movement and the circular arc 138' denotes a position of the cutter near the opposite end of its feed movement. 139 and 139' denote the locations of the axis of the cutter for the two positions. The cutter is rotated on its axis as it is fed back and forth along the length of a tooth space. The cutter is preferably rotated at a uniform velocity and the feed cam 115 is preferably so shaped also that the feed movement is at a uniform velocity. The cutter is then moved relative to the gear blank as though a circle circumscribed about the axis of the cutter were rolling on a line 141 which is parallel to the direction of feed. Two positions of the rolling circle are denoted at 134 and 134' respectively.

For bevel gears, the direction of feed is ordinarily inclined to the root surface of the tooth space being cut and the cutting blades or teeth of the cutter made of progressively varying height to cut tooth spaces which taper in depth from end to end according to the principles more fully described in the application above mentioned. The length of the feed movement is sufficient to cut the tooth spaces for their length. The blank is held stationary during cutting and is indexed on the return stroke of the cutter when the gap in the cutter is abreast of the blank. If the cutter is designed to cut on both its forward and return strokes, sufficient extra length of stroke must be allowed to permit of indexing.

To cushion the stroke of the carriage 34 and prevent undue shock or vibration at reversal and to hold the rollers 118 and 121 against the cam tracks 116 and 117, a hydraulic dampening and braking mechanism is provided. This is in the form of a piston 153 (Figs. 6 and 7) which reciprocates in a cylinder 154 formed in a casting that is secured in any suitable manner to the bed of the machine. The piston is connected to a piston-rod whose head 156 is secured in any suitable manner to the arm 123 of the feed-bar 120.

There is a well or reservoir 157 provided in the casting above the feed-bar 120. This well is filled with oil or other suitable liquid.

The cylinder 154 is connected with the reservoir 157 on opposite sides of the piston 153 by ducts 158 and 159, respectively. These ducts are normally closed by spring-pressed ball-check valves 162 and 168.

The cylinder 154 is also connected with the reservoir 157 on opposite sides of the piston 153 by ducts 171 and 174. The duct 171 leads into the cylinder 154 at the left-hand end of the cylinder as seen in Fig. 6 while the duct 174 leads into the cylinder at the right-hand end. The ducts 171 and 174 are normally closed by spring-pressed metering valves 177 and 177', respectively.

When the feed-bar 120 and carriage 34 move to the right from the position shown in Fig. 6, oil is sucked from the reservoir 157 through the duct 158. At this time, however, the ball-check valve 168 is held shut and the only way the oil can escape from the right hand end of the cylinder is through the metering valve 177' and duct 174. Thus a load is put on the roller 118 to hold it firmly against its track 116 which controls the forward feed movement. Similarly on the return stroke of the carriage 34, oil is sucked in from the reservoir 157 through the duct 159 but can only escape from the left-hand end of the cylinder 154 through the metering valve 177 and duct 171. Thus a load is put on the roller 121 to hold it firmly against its track 117.

The tensions of the springs for the metering valves 177 and 177' can be adjusted so that the load on the rollers is variable at will in accordance with conditions met in use.

*Index mechanism for work spindles*

During the cutting of a tooth slot of a gear blank, the blank is, as already stated, held against rotation and when the gap in the cutter is abreast of the blank, the blank is indexed. The indexing mechanism will now be described.

There is a notched index plate 150 keyed to each of the work spindles 80 (Figs. 11, 14, 16 and 17). Each index plate has the same number of notches as there are tooth spaces in the gear to be cut.

There is a locking dog 151 associated with each index plate. The dog is adapted to engage in a notch of the corresponding index plate to hold the work spindle against rotation during cutting. Each dog is pivotally mounted upon a stud 152 which is secured in the turret 76.

The locking dogs are normally urged into locking engagement with their respective index plates 150 by spring pressed plungers 225 (Figs. 14 and 16). Each plunger is housed in a casing 226 that is secured to the turret 76. Each plunger engages a hardened contact member 228 which is secured in the tail of the locking dog. The plungers are actuated by coil springs 229.

Associated with each work spindle is a Geneva wheel 155. Each Geneva wheel has as many notches as there are tooth spaces in the gear to be cut. The Geneva wheels are doweled to the corresponding index plates as clearly shown in Fig. 11.

Only one actuating mechanism is provided for effecting rotation of the work spindles to index the spindles when they are unlocked. This mechanism is mounted on a relatively stationary part of the machine and, as each work spindle is brought into cutting position by rotation of the turret, it is brought into operative relationship with this index actuating mechanism, and when the work spindle is moved away from cutting position, it is withdrawn from operative relationship with this index actuating mechanism.

Figure 17:
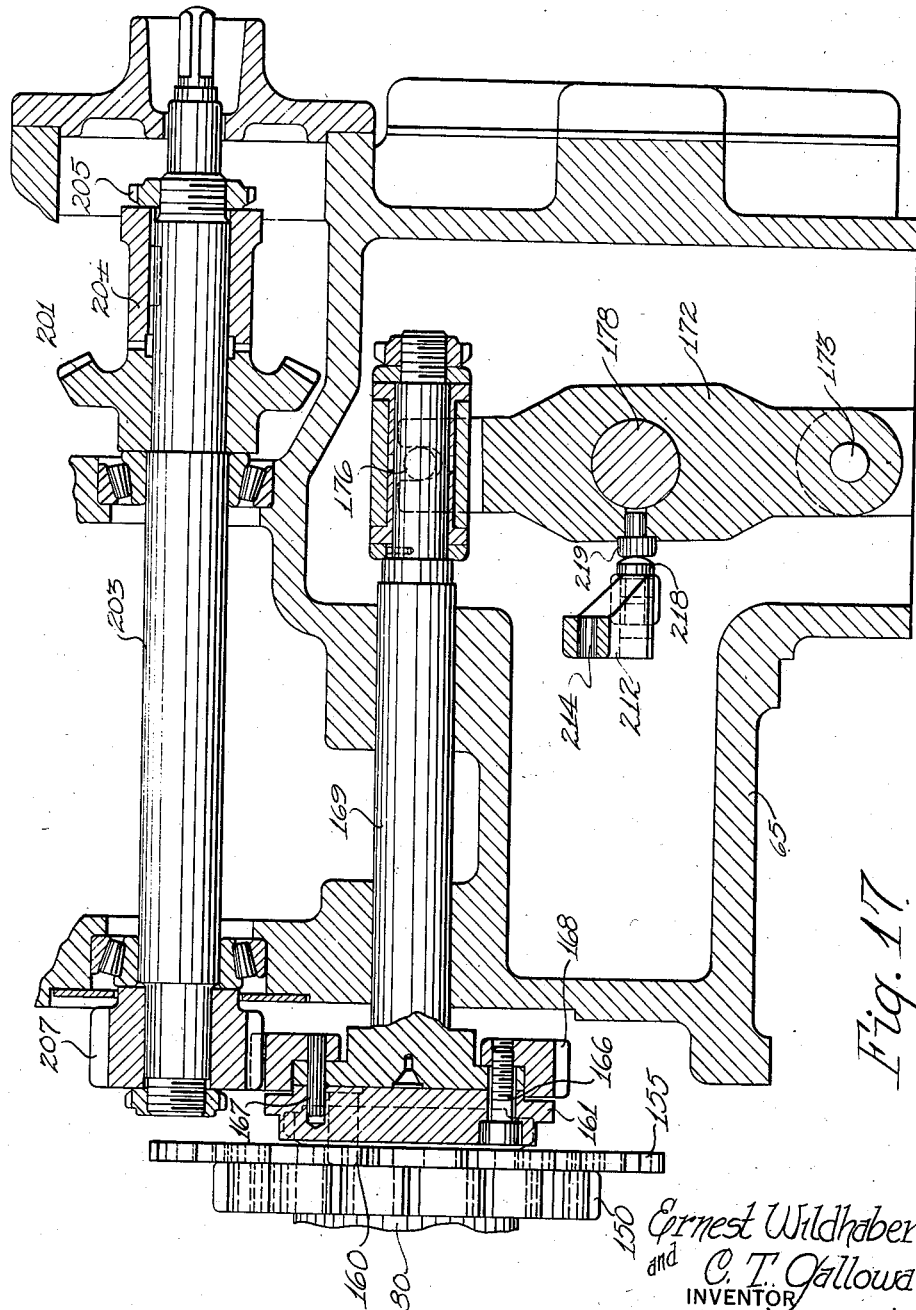
Fig. 17 is a fragmentary sectional view showing details of the mechanism for effecting rotation of a work spindle during the indexing operation.

The index actuating mechanism includes a pin 160 and a cam 161 (Figs. 16 and 17). The pin is secured to the cam to project beyond the front face of the cam. It is adapted to be engaged periodically with a notch of the Geneva wheel 155 of the work spindle, that is at the cutting station, to impart the indexing rotation to this work spindle. There is a block 163 secured by screws 164 to each of the index locking dogs 151 and each block has a nose 165 formed on it. The cam 161 is adapted to be engaged with the nose 165 of the locking dog, which is associated with the work spindle that is at the cutting station, so that as the cam is rotated in engagement with this nose 165, the locking dog 151 will be disengaged from the index plate of that work spindle to permit of the indexing of the spindle.

The cam 161 is secured by screws 166 and a dowel 167 to a spur gear 168. This spur gear is secured to a shaft 169 that is mounted for axial reciprocating movement in a column or support that is secured to or integral with the work head 65. Reciprocatory movement of the shaft 169 causes the pin 160 and cam 161 to be moved alternately into and out of operative movement with the Geneva wheel 155 and the nose 165 of a locking dog, respectively, which are associated with the work spindle then at the cutting station.

Figure 18:
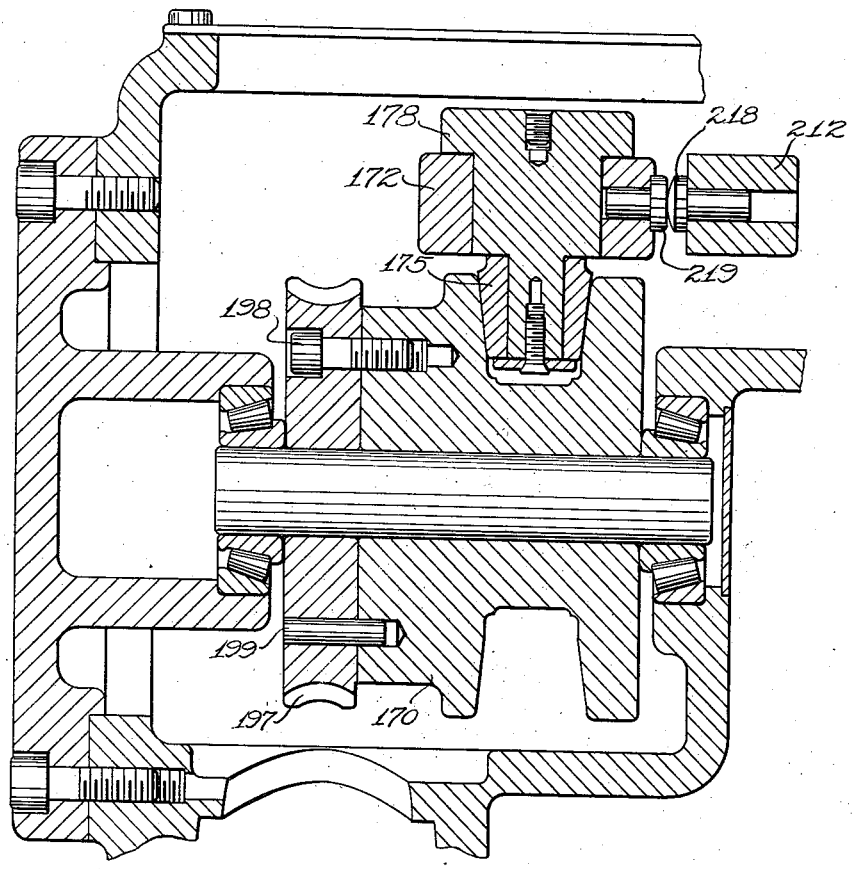
Fig. 18 is a fragmentary sectional view showing the cam and cooperating parts for shifting the work spindle rotating drive into and out of operating position.

The reciprocatory movement of the shaft 169 is effected by rotation of a cam 170 (Figs. 17, 18 and 24). There is a yoke member 172 pivotally mounted on a pin 173 in the work support 65. Mounted in this yoke member is a stud 178 which carries a roller 175 (Figs. 14, 16, 17 and 13). This roller engages in the track-way of the cam 170 so that as the cam 170 is rotated, the yoke member is swung about its pivot 173. The yoke member is bifurcated at its upper end to engage a pin 176 that is secured in the shaft 169. Through the rotation of the cam 170, then, the shaft 169 is moved to and fro, to move the pin 160 and cam 161 into and out of operative engagement with the Geneva wheel 155 and locking dog 151, respectively, that are at any given time at the cutting station.

The cam 170 is driven from the shaft 98 in time with the cutter rotation and the rotation of the feed-cam 115. There is a bevel gear 180 (Figs. 6 and 24) which has a splined connection with this shaft. This bevel gear meshes with a bevel gear 181 which is secured to a shaft 182 (Figs. 19 and 24). There is a bevel gear 184 keyed to the shaft 182. This bevel gear meshes with the bevel gear 185 which is keyed to a shaft 186. A bevel pinion 187, which is also keyed to the shaft 186, meshes with a bevel gear 188 which is keyed to a shaft 190. The shaft 190 has a telescoping splined connection with a sleeve 191 to which is keyed a bevel gear 192. The bevel gear 192 meshes with a bevel gear 193. This gear 193 is formed with an integral sleeve which is keyed to a shaft 195. There is a worm 196 formed integral with this shaft. This worm meshes with a worm wheel 197 (Figs. 16, 18 and 24) that is secured by screws 198 and a dowel 199 to the cam 170.

The shaft 186 is journaled on anti-friction bearings in a swivel member 194 that is rotatably journaled in a bracket 202 which is secured to one side of the bed 30 of the machine. The sleeve 191 is journaled on anti-friction bearings in a swivel member 206 which is rotatable in a sleeve 208 that is secured by screws to a bracket 209 that is fastened to the work support 65. The two swivels 194 and 206 and the telescoping shaft 190 permit of angular adjustment of the work head or support 65.

The rotary motion required to drive the cam 161 (Figs. 16, 17 and 24) to effect withdrawal of the locking dog 151 and rotation of the Geneva wheel 155 at the cutting station is produced by rotation of the gear 168 which is secured to this cam 161. This gear is driven from the shaft 195 (Figs. 17, 19 and 24). There is a bevel pinion 200 keyed to the upper end of this shaft. This bevel pinion meshes with a bevel gear 201 which is rotatably mounted on a shaft 203. There is a slidable clutch member 204 keyed to the shaft 203. This clutch member 204 is provided at one end with face clutch teeth which are adapted to be engaged with corresponding clutch teeth formed on the opposed face of the gear 201. The clutch member 204 is normally held in driving engagement with the gear 201 by a nut 205 which threads on the shaft 203. The clutch member 204 may be released, however, to permit manual rotation of the shaft 203 for hand adjustment of the index mechanism. For this purpose, the shaft 203 is formed at its outer end with a hexagonal head to receive a suitable wrench. There is a spur pinion 207 keyed to the shaft 203 at its inner end and this spur pinion meshes with the spur gear 168 to drive the same.

From the gearing described, it will be seen that the cam 170, which controls the reciprocating movement of the shaft 169 is driven in time with the cutter rotation and with the rotation of the feed cam 115. The gearing is so selected that when the gap 47 in the cutter C (Fig. 3) comes abreast of the gear blank in the rotation of the cutter, the shaft 169 is shifted forward to the position shown in Fig. 17. This moves the cam 161 into operative relation with the nose 165 of the lug 164 which is secured to the locking dog 151 that is associated with the work spindle that is then at the cutting station. The cam 161 is, of course, rotating all the while under actuation of the gears 207 and 168 and the train of gearing which drives the same. This train of gearing is so timed with the other operations of the machine that immediately after the cam 161 comes into operative relationship with the nose 165, the high point in the cam rotates into position and the locking dog 151 is swung out of engagement with the notch of the index plate 150 with which it has previously been engaged. As the locking dog 151 begins to move out of locking position, the pin 160 which is carried by the cam, rotates into engagement with a notch of the Geneva wheel 155, that is on the work spindle which is at the cutting station, and begins to drive that Geneva wheel. The pin 160 continues to drive the Geneva wheel 155 through an angular distance sufficient to index the work spindle one notch of the index plate. Then the nose 165 of the index lock lever 151 rides off of the high portion of the cam 161 and drops into engagement with the notch of the index plate next succeeding that with which it has previously been engaged. The index plate and work spindle is thus again locked up. At this same time, the pin 160 will have been rotated, by rotation of the cam 161, out of engagement with the Geneva wheel. The indexing operation will now have been completed. At the instant that the index is completed, the cam 170 operates to shift the shaft 169 to the right from the position shown in Fig. 17. This withdraws the cam 161 from operative relationship with the nose 165 of the index lock lever 151 and the pin 168 from operative relation with the Geneva wheel. The indexing cycle is thus completed.

To prevent the index locking dog 151 from jumping out of engagement with an index plate 150 until the dog is positively disengaged therefrom, a spring pressed pin 210 (Fig. 19) is provided. This pin is adapted to engage behind the block 164 when the locking dog 151 is in locking position. The pin 210 is normally pressed into this position by a coil spring 211. The pin 210 is retracted at the proper time, to permit disengagement of the locking dog from the index plate for indexing, by a lever 212 (Figs. 17, 18 and 19). The lever 212 is pivoted at a point intermediate its ends on a pin 215 which is secured in the bracket 209 that houses the cam 170 and the shafts 195 and 203. The lever 212 is connected at one end with the pin 210, having an opening 214 to receive the pin. At its opposite end, the lever 212 carries a hardened contact member 218 which engages a hardened contact member 219 that is secured in the yoke lever 172. Thus, as the yoke lever 172 is rocked by the cam 170 to move the shaft 169 to or from operative position, the lever 212 is rocked to move the pin 210 from and to operative position. The tension of the spring 211 (Fig. 19) may be adjusted by the nuts 220 which thread onto the pin 210.

*Turret indexing mechanism*

During cutting of the blank which is at the cutting station, the turret is locked up. The turret is held against rotation by a locking dog 235 (Figs. 14 and 25) and by a split clamp which will be described more fully later. The locking dog 235 is adapted to be engaged successively in one of three equidistantly spaced notches 236 that are formed in the periphery of a plate 237 (Fig. 11) which is secured by screws 238 to the turret 76. To index the turret, the locking dog 235 must first be disengaged.

Figure 25:
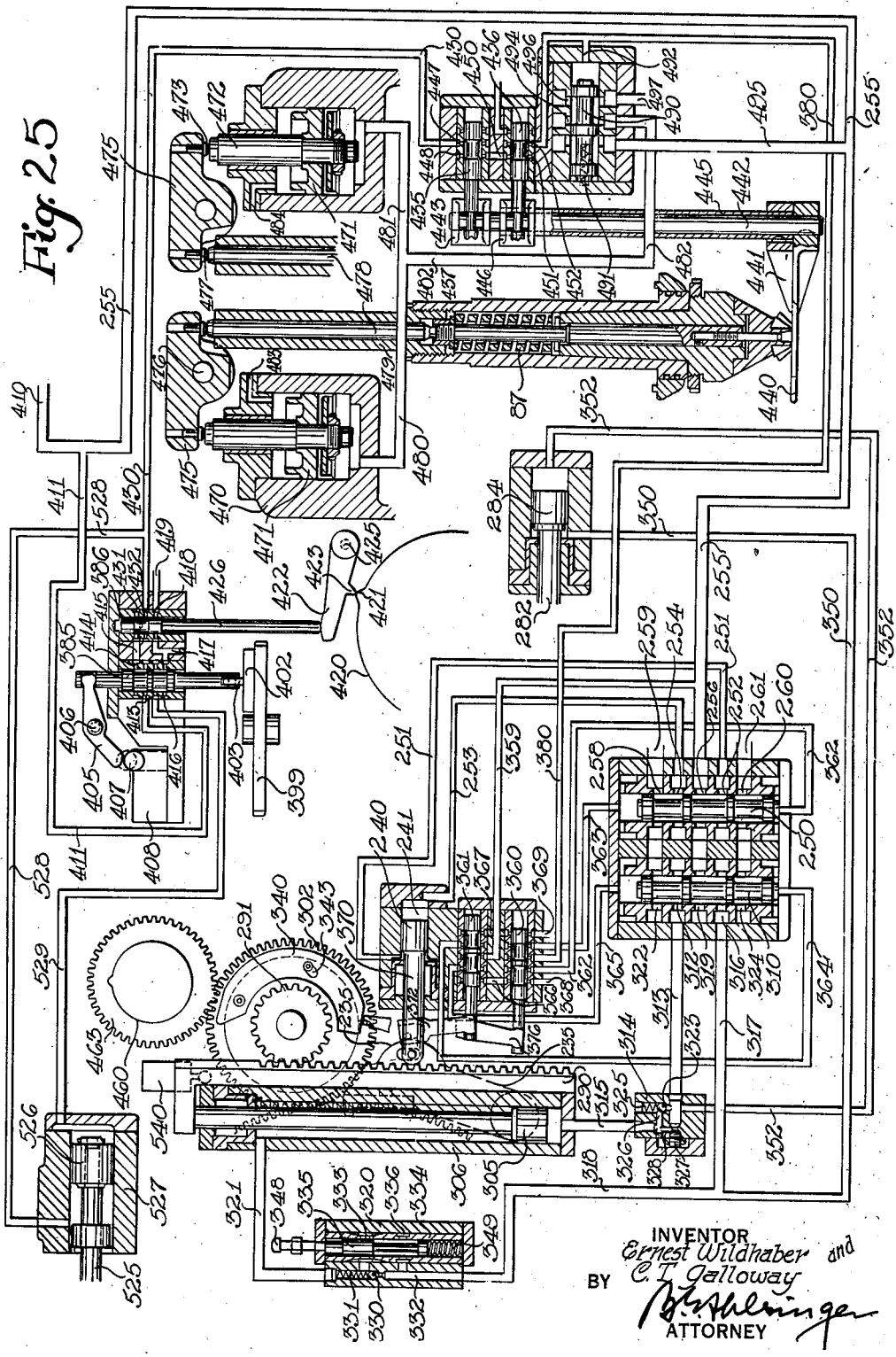
Fig. 25 is a hydraulic diagram of the machine.

The locking dog 235 is moved to and from operative position hydraulically by a piston 240 (Figs. 14 and 25). This piston slides in the bore of a cylinder 241 formed in a casting 242 that is mounted upon the work support 65 at one side of the turret housing 75. The piston 240 is connected to the locking dog 235 by a pin 243 which passes through an arcuate slot 244 formed in the locking dog. The locking dog is pivoted upon a pin 245 which is secured in a lug formed on the casting 242.

The movement of the piston 240 is controlled by a valve 250. This valve is housed in the casting 242. It is connected with one side of the piston 240 by a duct 251 and the port 252. It is connected with the other side of the piston 240 by a duct 253 and the port 254. The pressure oil is supplied to the chamber of the valve 250 from the duct 255 through the port 256. The motive fluid is exhausted from the chamber of the valve 250 through either of the ports 258 or 260 and the ducts 259 and 261. The two ducts 259 and 261 lead directly back to the sump of the machine.

Figure 10:
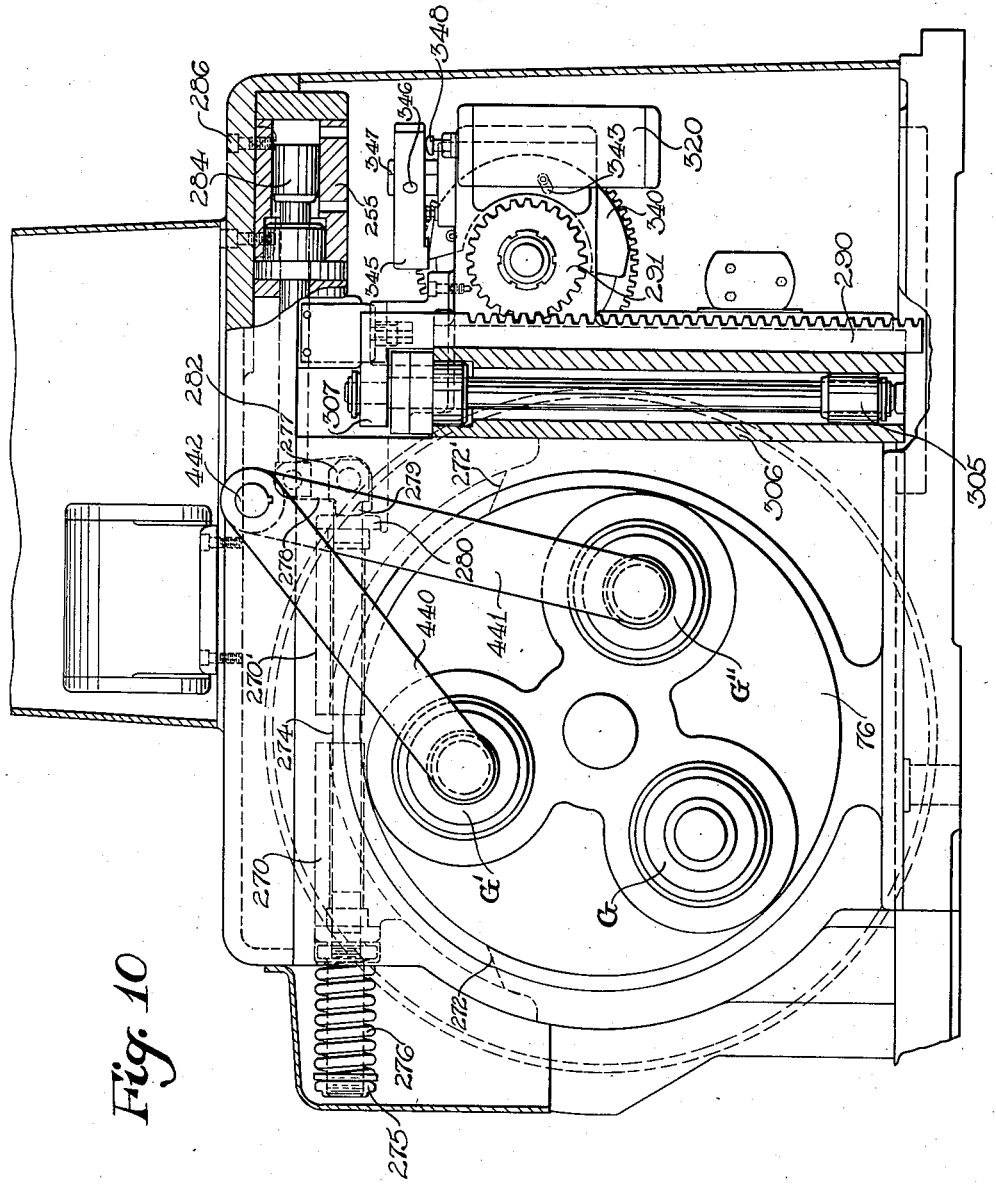
Fig. 10 is a front elevation of the work turret and head, parts being broken away.

The turret housing 75 does not form a complete circular bearing for the turret but this bearing is split and shaped to provide two opposed lugs or ears 270 and 270' as shown in Fig. 10. The turret housing is further provided with parallel slots on both sides of each ear 270 and 270' so that two clamping tongues are formed. The slots forming one of these tongues are indicated at 273 and 273' and are clearly shown in Fig. 11. The slots for the tongue, which terminates in the ear 270 extend around the cutter housing to the point indicated by the dotted line 272 in Fig. 10 while the slots for the ear 270' extend to the point indicated by the dotted line 272' in this figure.

The ears 270 and 270' are formed with aligned bores and there is a rod 274 mounted in the bores of these ears. There is a nut 275 threaded on one end of this rod and between this nut and the opposed face of the ear 270 is mounted a coil spring 276. The other end of the rod is formed with a pair of ears 277 between which there is pivotally mounted a bell-crank lever 278. This lever is formed with a cam surface 279 at one end which is adapted to engage a hardened piece 280 that is secured to the opposed face of the ear 270'. The other end of the lever 278 is pivotally connected to the rod 282 of the piston 284 that reciprocates in a cylinder 285 (Figs. 10 and 25) which is secured by screws 286 to the turret housing. It will readily be seen that when the lever 278 is rocked in one direction, the tongues 270 and 270' will be drawn together to clamp the periphery of the turret, while when the lever 278 is moved in the opposite direction, the turret will be released.

Figure 11:
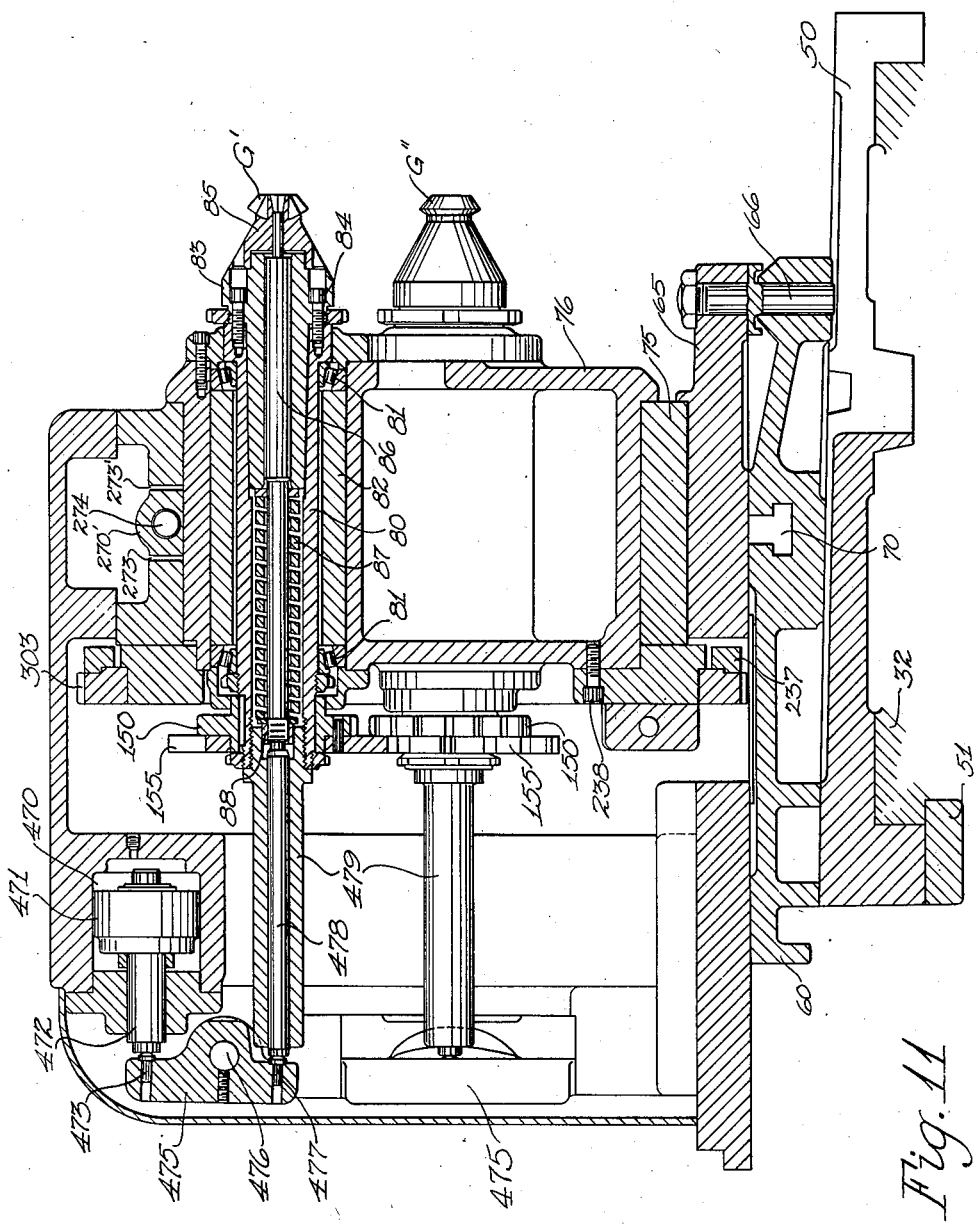
Fig. 11 is a vertical sectional view through the turret.
Figure 12:
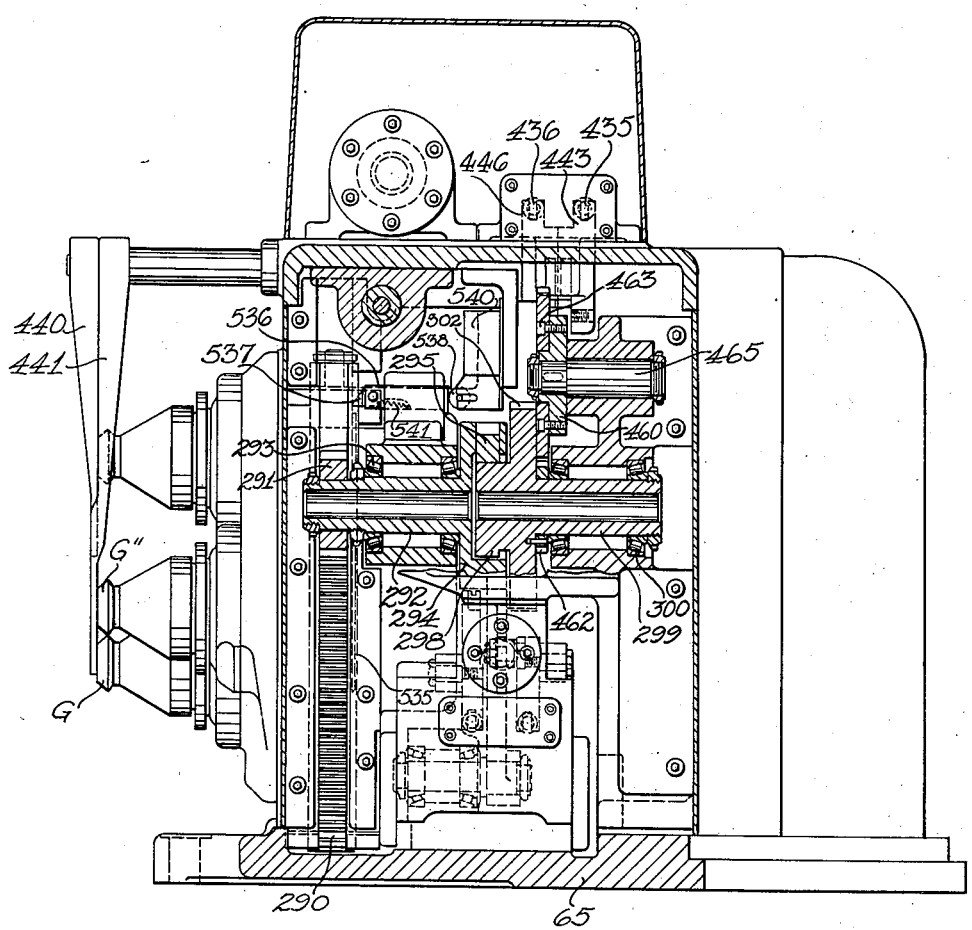
Fig. 12 is a side elevational view of the work head, parts being broken away to show the turret operating mechanism.

The rotation of the turret for indexing of the same, after disengagement of the locking dog 235 and release of the turret clamping mechanism, is effected by reciprocation of a rack 290 (Figs. 10, 12 and 25). This rack meshes with a spur gear 291. The spur gear 291 is secured at one end of a sleeve member 292 to rotate therewith. The sleeve member 292 is mounted on roller bearings 293 in the turret housing. It is formed at its other end with a flange or head 294. This head is slotted or recessed part-way around its periphery and in the space so formed there is pivotally mounted a pawl 295 (Figs. 12 and 13). This pawl 295 is mounted upon a pivot pin 296 that is secured in the head 294. The pawl is normally urged by a spring actuated plunger 297 into engagement with the tooth of a single tooth clutch or ratchet wheel 298. The ratchet wheel 298 is formed at one end of a sleeve member 299 which is mounted on roller bearings 300 in the turret housing in axial alignment with the sleeve member 292. There is a spur gear 302 integral with the sleeve member 299. This spur gear meshes with a large spur gear 303 (Figs. 11 and 14) which is secured to the turret 76.

The ratchet and pawl mechanism included in the drive to the turret constitutes a one-way drive mechanism so that the turret is rotated only on reciprocation of the rack 290 in one direction. In the opposite direction of reciprocation of the rack 290, the pawl ratchets idly over the ratchet wheel.

The rack 290 is reciprocated hydraulically. There is a piston 305 mounted to reciprocate in a cylinder 306 (Figs. 10 and 25) which is formed in the turret housing. The rack 290 has an arm 307 at its upper end which is secured to the projecting end of the piston rod of the piston 305.

The direction of movement of the piston 305 is controlled by a valve 310 (Figs. 14 and 25) which is mounted in parallelism to the valve 250 that controls the direction of movement of the turret locking-dog 235. The motive fluid is supplied to or exhausted from one end of the piston 305 from the valve 310 through ports 312, a duct 313, a valve casing 314 and the duct 315. The motive fluid is supplied to or exhausted from the other end of the piston 305 through the port 316, the duct 317, the duct 318, the valve casing 320 and the duct 321. Pressure fluid is supplied to the valve 310 from the line 255 through the ports 256 of the valve 250 and the ports 319. It is exhausted from the valve 310 either through the ports 322 and 258 and duct 259 or through the ports 324 and 260 and duct 261.

The valve casing 314 contains a ball-check 323 which is normally closed by a spring 325 but which is opened when the duct 313 is on supply. When the ball check 323 is open, the duct 313 is connected with the duct 315 through the duct 326. The needle valve 327 which threads adjustably into the valve casing 314 controls the rate of exhaust from the lower end of the cylinder 306 through the duct 315. The duct 328 connects the duct 315 with the duct 313 when the duct 315 is on exhaust.

The valve casing 320 contains a ball-check valve 330 and a throttle valve 335. The ball-check valve is normally closed by a spring 331. When the line 318 is on supply, however, this ball-check valve is opened and the line 318 connects with the duct 321 through the duct 332. When the duct 321 is on exhaust, as it is during the indexing of the turret, the ball-check valve 330 is closed and the exhaust fluid flows from the upper end of the cylinder 306 through the line 321, the ports 333 in the sleeve 334 in which the throttle valve 335 slides, and the ports 336 in this sleeve back into the line 332.

The amount of opening of the ports 333 is controlled by the position of the throttle valve 335 which in turn is controlled from a cam 340 (Figs. 10, 13 and 25). The cam 340 is secured by screws 342 to the front face of the enlarged head 294 in which the pawl 295 is mounted. One of the screws 342 passes through a slot 343 in the head. This slot permits of angular adjustment of the cam plate about the other screw so as to permit variation of the amount of opening of the throttle valve during the turret rotation.

The cam 340 operates a lever 345 which is pivotally mounted at 346 on a post 347 which is secured to the turret housing. The lever engages at one end with the periphery of the cam 340 and at its opposite end with the head 348 of the stem of the throttle valve 335. The head 348 of the throttle valve is held against the lever 345 by a coil spring 349 housed in the valve casing 320.

The valve 310 (Fig. 25), which controls the direction of reciprocation of the piston 305, also controls the direction of movement of the piston 284 that operates the turret clamping mechanism. The valve 319 is connected to one side of the piston 284 by the duct 317 and a duct 350. It is connected to the opposite side of the piston 284 by the duct 313 and a duct 352.

The directions of movement of the two reverse valves 250 and 310 (Fig. 25) are controlled from two pilot valves 360 and 361, respectively. The pilot valve 360 controls supply and exhaust of the motive fluid to and from opposite ends of the valve 250 through ducts 362 and 363, respectively. The valve 361 controls supply and exhaust to and from opposite ends of the valve 310 through ducts 364 and 365, respectively.

The pilot valve 361 is shifted in opposite directions on movement in opposite directions of the piston 240 which operates the turret locking dog 235. The stem 370 of the piston 240 carries a pin 371 (Figs. 15 and 25) which engages in a recess or groove in the side of an arm 372. This arm is pivoted upon a stud 374 and is furcated at its lower end to straddle the stem of the valve 361. Hence, as the turret locking dog 235 is moved to or from locking position, the valve 361 is shifted to control the direction of movement of the reverse valve 310 which in turn controls the direction of movement of the piston 305 that operates the rack 290 of the turret rotating mechanism.

The movements of the pilot valve 360 are controlled in turn from the turret rotating mechanism. Thus the index and lock-up mechanisms of the turret are interlocked. The head 294, which carries the pawl 295 of the turret rotating mechanism, also carries a pin 375 (Figs. 13, 14, 15 and 25). This pin is adapted to engage one end of a lever 376 that is pivotally mounted intermediate its ends upon a stud 377. The opposite end of this lever is furcated and straddles the stem of the valve 360. Since the head 294 is rotated in opposite directions on reciprocation of the rack 290 in opposite directions, it will be seen that the lever 376 is swung about its pivot stud 377 in one direction on movement of the rack 290 in one direction and is swung in the opposite direction on movement of the rack 290 in the opposite direction. The lever 376 is beveled on both sides at its upper end as indicated at 378 (Figs. 14 and 15).

The pressure fluid is supplied to the pilot valve 361 from the line 255 through the duct 359. It is exhausted from this valve either through the ducts 366 and 368 or through the ducts 367 and 369. The ducts 368 and 369 are connected directly to the sump of the machine.

The motive fluid is supplied to the pilot valve 360 through a duct 380. It is exhausted therefrom either through the duct 368 or the duct 369. The supply of motive fluid to the duct 380 is controlled by a series of valves which function as safety valves to protect the machine against breakage or other damage. These valves and their functions will now be described.

*Safety valves*

There are two valves 385 and 386 provided (Fig. 25) which serve to prevent indexing of the turret until all of the tooth spaces of a gear have been cut and until the cutter is at the end of its return stroke so that it will clear the blank when the turret is indexed. The valve 385 is tripped from a gear, which is driven in time with the feed cam and cutter rotation, to make one revolution during the cutting of the tooth spaces of a gear. The valve 386 is tripped by a cam which is secured to the feed cam to revolve therewith. Both valves are housed in the casting 387 (Fig. 6) which is secured to one side of the bed 30 of the machine.

Figure 7:
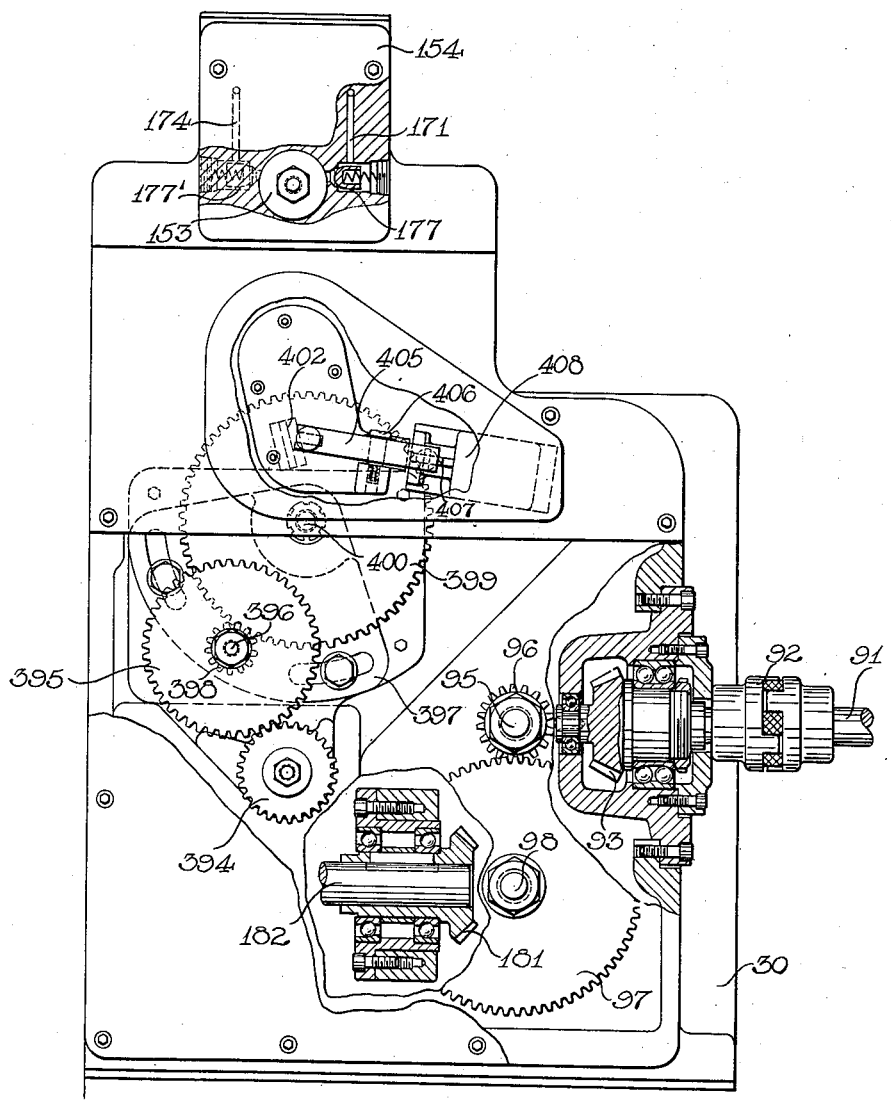
Fig. 7 is a view taken at right angles to the view of Fig. 6 and looking at one end of the feed control bracket, parts being broken away.

The tripping mechanism for the valve 385 will first be described. Secured to the lower end of the feed cam shaft 140 (Figs. 6 and 24) is a bevel gear 390. This gear meshes with a bevel gear 391 that is secured to a shaft 392. To the outer end of the shaft 392 is secured a spur gear 394 (Figs. 6, 7 and 24). This spur gear meshes with a spur gear 395 that is journaled on a stud 396 which is secured in an adjustable quadrant 397. There is a spur pinion 398 also secured to this stud.

This pinion meshes with a spur gear 399 which is rotatably mounted upon the stud 400 about which the quadrant is adjustable.

There is a cam or lug 402 secured to one side of the gear 399. This cam is adapted to engage a roller 403 which is secured in one end of the stem of the valve 385 (Figs. 6, 7, 24 and 25). The lug 402 is arcuate in shape and is beveled at both ends so that the roller 403 can readily ride up on to and off of the lug in the rotation of the gear 399. The train of gearing 394, 395, 398 and 399 is so selected that the gear 399 makes one revolution during the time that a gear is being cut. When the last tooth space of the gear blank has been cut, the gear 399 will have rotated so far that the roller 403 will ride up on the cam 402 and shift the valve 385.

The roller 403 is carried in one end of the stem of the valve 385. At its other end, the stem of the valve 385 is connected to a bell crank lever 405 (Figs. 6, 7 and 25). This lever has a furcated end which straddles the valve stem and engages in recesses formed in opposite sides of the valve stem. This lever is pivoted upon a stud 406 and its free arm engages the roller 407 of a limit switch 408.

The limit switch 408 is connected in the circuit to the feed motor 90 (Fig. 24) and it is a normally closed switch. When the roller 403 rolls up on the cam 402, the roller 407 is pressed down from the dotted line position shown in Fig. 25 to the full line position shown in this figure. Thus the valve 385 is shifted and the circuit to the feed motor 90 is broken and this motor and all the parts driven thereby are stopped when the gear 399 has made a complete revolution, that is, when the gear blank at the cutting station has been finished.

The main supply duct for the hydraulic motive fluid of the machine is indicated at 410 (Fig. 25). This duct supplies the two lines denoted at 411 and 255, respectively. When the valve 385 is shifted by the cam 402 to the position shown in Fig. 25, the motive fluid is supplied to the chamber of the valve 386 from the line 411 through the ports 413 and 414 in the chamber of the valve 385, and the line 415 which connects the two valves 385 and 386. At this time the ports 416 of the valve 385 are on exhaust through the duct 417, which connects the valves 385 and 386, the ports 418 of the valve 386, and the duct 419 which leads back to the sump of the machine.

The valve 386 is, as already described, operated in time with the cutter rotation and is provided to insure that the cutter is at the end of the return stroke of the carriage 34 before indexing of the turret can take place. The valve 386 is operated by a cam 420 (Figs. 6, 8 and 25). This cam is formed with a single lobe 421 which operates a lever 422 through the medium of a rider or dog 423 that is secured to or integral with the lever. The lever 422 is pivoted at one end on a stud 425. At its opposite end, it engages the head of the projecting stem 426 of the valve 386. The valve stem is held in contact with the lever by the coil spring 424 (Fig. 6).

When the cam 420 is in the position shown in Fig. 25, and the gear 399 is also in the position shown in this figure, the duct 430 is put on supply from the duct 411 through the ports 413 and 414 of the valve 385, the duct 415 which connects valve 385 with valve 386, and the ports 431 and 432 of the valve 386. The two valves 385 and 386 must be in the positions shown in Fig. 25 before the turret 76 can be indexed. That is, the gear blank at the cutting station must have been finished and the cutter C must be at the end of its return stroke with the gap 47 in the cutter abreast of the blank.

The cam 420 is so mounted on the feed cam shaft 140 (Figs. 6 and 8) that its lobe 421 will be in registry with the gap 47 in the cutter C. Thus assurance is had that, when the lobe 421 trips the valve 386, the cutter will be at the end of its return stroke and the gap in the cutter will be abreast of the blank which is at the cutting station.

The cam 420 makes a revolution, of course, on each revolution of the feed cam 115. Thus the valve 386 is shifted once on each revolution of the feed cam 115. The duct 430 (Fig. 25) is not put on supply, however, until the valve 385 is also shifted and this occurs only when the gear blank at the cutting station has been finished as above described.

To insure against indexing of the turret unless gear blanks have been properly chucked at the loading stations, further safety valves 435 and 436 (Figs. 14 and 25) are provided. These valves control the connection of the line 430 with the line 380 that supplies the motive fluid to the pilot valve 360. These valves are adapted to be shifted manually in one direction to put the line 380 on supply. For this purpose, they are connected to flags or arms 440 and 441, respectively. Each of these arms has a plane rear face. The arms are adapted to be passed in front of the gear blanks that are secured on the two work spindles, that are at the loading stations, to insure that the blanks are properly chucked on these spindles. If an arm cannot be swung down in front of a gear blank, the blank has not been properly drawn back against its arbor by the chucking mechanism. That is, it is not properly chucked. One arm 440 is provided to test the chucking of gear blanks at one of the loading stations and the other arm 441 is provided to test the chucking of the gear blanks at the other loading station.

The arm 440 (Figs. 10, 12 and 25) is keyed to a shaft 442 at one end thereof. Keyed to this shaft 442 (Fig. 13) at its opposite end is a yoke member 443. This member 443 is bifurcated at one end to straddle and seat in recesses formed in opposite sides of the elongated stem 437 of the valve 435 at a point intermediate the ends of the valve stem. Hence, as the shaft 442 is rocked, the valve 435 will be shifted in one direction or the other. A coil spring 444, which surrounds the stem at a point beyond the connection of the stem with the yoke member 443, normally urges the valve to the left from the position shown in Fig. 14, that is to a position in which the connection between the lines 430 and 380 (Fig. 25) will be shut off.

The flag or arm 441 is keyed to one end of a sleeve 445 which surrounds the shaft 442 and in which the shaft 442 is journaled. There is a yoke member 446, similar to the yoke member 443, keyed to the sleeve 445 at the rear end of the sleeve. This yoke member is connected to the stem of the valve 436 in a way similar to the connection between the yoke member 443 and the stem of the valve 435. A coil spring, similar to the coil spring 444, is provided to actuate the valve 436 normally to the right from the position shown in Fig. 25 to shut off the connection between the lines 430 and 380. In use, when the operator has chucked a gear blank at one of the loading stations, he pulls down the corresponding arm 440 or 441, as the case may be. These arms are provided with plane rear faces, as stated, and the arm 441 is constructed, as clearly shown in Fig. 12, so that its plane rear face 438 lies in the same plane as the rear face 439 of the arm 440.

When the arms 440 and 441 are pulled down, the valves 435 and 436 are shifted by the yoke members 443 and 446, respectively, to the positions shown in Fig. 25. This opens the connection between the lines 430 and 380 through the ports 447, 448, the duct 450 and the ports 451 and 452. If either blank is not chucked properly on the work spindle at the corresponding loading station, then the arm 440 or the arm 441, as the case may be, cannot be passed in front of the gear blank mounted on that spindle and the corresponding valve will not be shifted. Hence, the line 380 will not be opened to supply and hence the turret cannot be indexed.

When the arms 440 and 441 are swung down, the valves 435 and 436 are locked in the positions shown in Fig. 25. For this purpose, two locking dogs 456, of which one only is shown, are provided. These dogs are mounted alongside one another. Each locking dog is formed with a hook at one end to engage the tail portion 455 of either the yoke member 443 or the yoke member 446 (Fig. 14). One dog engages one of these yoke members and the other dog engages the other yoke member. At its opposite end, each dog is formed with a lug which is adapted to ride on the periphery of a single-lobe cam 460. The dogs are pivoted intermediate their ends on a stud 457. Each dog is constantly urged into locking position by a spring-pressed plunger 458 so that when the yoke-members 443 and 446 are moved to the positions shown in Figs. 14 and 25 by downward movement of the arms 440 and 441, the dogs snap over the tails of these yoke members to hold them in these positions.

The cam 460 is adapted to trip the locking dogs 456 out of locking position. This cam is keyed to a stub-shaft 465 that is journaled in the turret housing. The cam is driven from the turret rotating mechanism. There is a spur pinion 462 (Figs. 12 and 25) which is secured to the gear 302 of the turret drive. This pinion 462 meshes with a spur gear 463 which is secured to the cam 460. When the turret drive mechanism is actuated, then, the cam 460 is rotated to cause the locking levers 456 to be disengaged from the yoke members 443 and 446. The coil springs 444 then operate to shift the valves 435 and 436 to close off the connection between the ducts 430 and 380.

The chuck releasing mechanism

Threaded into the inner end of each of the work spindles is a sleeve 479 which forms a support and guide for a reciprocable rod 478. The rods 478 are therefore carried around with the work spindles during indexing rotation of the turret 76. Each rod 478 is mounted in axial alignment with the draw-bar 86 of the corresponding work spindle and at its forward end abuts against the rear end of the draw-bar. To release the chucking mechanism associated with a spindle, the proper rod 478 is moved forward in its sleeve 479 to force the draw-bar 86 forward against the resistance of the coil-spring 87.

The chuck releasing mechanism is hydraulically actuated. There are two cylinders 470 formed in the support 65 (Figs. 11, 14 and 25). In each of these there reciprocates a piston 471. Each piston is secured to a piston rod 472. There are two rocker arms pivotally mounted on the turret housing by means of pins 476. One rocker arm is associated with each of the piston rods 471. Each rocker arm carries a hardened contact member 473 at one end and a hardened contact member 477 at its opposite end. The contact members 473 engage the outer ends of the piston rods 472. The contact members 477 are adapted to engage the outer end-faces of the two rods 478 which are associated with the two work spindles that at any given time are at the two loading stations.

The motive fluid is supplied to and exhausted from the cylinders 470 through ducts 480 and 481, respectively, which communicate with a common duct 482. Leak-returns for the cylinders 470 are provided at 483 and 484, respectively. The leak-returns communicate with the sump of the machine.

To release the two chucking mechanisms of the two work spindles which are at the loading stations, the lines 480 and 481 are put on supply to force the pistons 471 rearwardly in their cylinders 470.

The operation of the chucking mechanism is controlled by a valve 490 (Fig. 25). This valve is normally actuated in one direction by a coil spring 491. It is moved in the opposite direction hydraulically when the duct 492, which is connected to the duct 380, is on supply. When the valve is in the position shown in Fig. 25, the motive fluid flows from the duct 495, which communicates with the main duct 255, through the ports 494 of the valve 490 into the duct 482 to release the chucking mechanisms of the two spindles which are at the loading stations. When the valve 490 is shifted to the right, however, the cylinders 470 are put on exhaust through the ports 494 and 496 and the duct 497. The duct 497 is connected to the sump of the machine.

Chip removing mechanism

Because of the high speed of production of the present machine, a pile of chips would be formed very rapidly and if no special provision were made for chip disposal, would fill very quickly any available chip space provided in the bed of the machine. For this reason, a special mechanism has been devised for automatically carrying the chips out of the machine. This mechanism is illustrated in Figs. 20 to 23 inclusive. This mechanism is mounted in the base of the machine beneath an opening through which the chips may fall as they are cut from a gear blank. The chip removing mechanism is in the form on an endless conveyer having scrapers or drags mounted thereon at spaced intervals which drag or sweep the chips along with them as the conveyer moves. The conveyer is formed by two parallelly mounted chains 500 and 500' and the scrapers or drags, which are denoted at 512 are carried by and between these two chains. Each scraper is secured at its opposite ends by pins 513 and 513' to opposed links of the two chains.

Each chain wraps around a pair of sprockets 501 and 502. The two sprockets 501 are secured to a shaft 503 which is journaled at opposite ends on suitable bearings in a pair of slide members 505. The slide members 505 are mounted for adjustment on the side walls of the casing 504 which encloses the conveyer. There is a tongue 506 mounted on the shaft 503 to which the screw 507 is secured. This screw threads through the end wall 508 of the casing 504 so that by adjusting the screw 507, slack may be taken out of the chain. The other pair of sprocket members 502 are keyed to a shaft 510 which is journaled on suitable bearings in the conveyer casing at the end thereof remote from the sprockets 501.

A set of guide rollers 514 are provided intermediate the two sets of sprockets. These rollers are secured to a shaft 511 which is suitably journaled on antifriction bearings in the side walls of the casing 504. The rollers 514 and shaft 511 are so mounted that the scraping bars 512 which are carried by the underparts of the chains are pressed down into contact with the bottom wall 515 of the casing. The lower wall 515 of the casing is horizontal for the portion of its length between the end wall 508 and the rollers 514, then is inclined upwardly.

The chips made by the cutter drop through an opening 516 in the upper wall 517 of the chain casing and fall onto the lower wall 515 of the casing. As the scrapers come along in the rotation of the chain, they carry these chips along with them along the bottom of the casing and up the inclined bottom wall thereof. An opening or spout 520 is formed at the top of the inclined lower wall of the casing. When the chips have been conveyed to this point they drop into a suitable container which may be placed alongside the machine and may readily be removed and replaced.

The chip conveyer mechanism is operated step by step in time with the other operations of the machine. It is driven by a ratchet and pawl mechanism, the ratchet wheel 522 of which is keyed to the shaft 510. The ratchet wheel is operated by a pawl 523 which is held in operative position resiliently by a coil spring 524 and which is secured in the piston rod 525 of a piston 526 (Fig. 25). This piston reciprocates in a cylinder 527, one end of which is connected by means of the duct 528 with the duct 430 and the opposite end of which is connected by means of the duct 529 with the valve 385. Since the valve 385 is operated by the gear 399 and cam 402 once for each gear cut on the machine, it will be seen that the chip conveyer is also advanced once for each gear cut.

*Operation of the machine*

The operation of the machine may now be described. By adjusting the carriage 50 on the bed 30 and the support 65 angularly on the plate 60 about the axis of the pin 66, the turret can be adjusted so that when a gear blank is at the cutting station it will be in correct position in accordance with the tooth-depth and pitch cone angle of the gears which it is desired to cut. By adjusting the plate 60 on the carriage 50, the position of the axis of the gear may be varied relative to the cutting plane of the cutter thereby permitting control of the tooth bearing produced on the gear. The feed stroke of the cutting tool may be adjusted in accordance with the face-width of the gear blank to be cut by adjusting the carriage 34 (Fig. 9) with reference to the bar 120 through rotation of the pinion 133.

When all of the adjustments have been made, the machine may be started up. The cutter then rotates on its axis and is simultaneously reciprocated across the face of the gear blank, which is at the cutting station. The cutter is rotated in time with the reciprocating movement and makes one revolution for a complete feed cycle, that is, for a forward and return stroke of the cutter. The gear blank is held stationary while the tooth space is being cut but when the gap in the cutter is abreast of the blank, the blank is indexed. When the cutter has made as many revolutions as there are tooth spaces to be cut in the gear blank, the cutting operation is completed.

The drive to the cutter is from the motor 90 through the gears 93, 94, 96, 97, 100, 101, 103, 104, 108 and 109 (Figs. 24, 5 and 6). The reciprocating movement of the cutter is effected by the feed cam 115 (Figs. 24, 6 and 8) which reciprocates the carriage 34, in which the cutter is journaled, through the rollers 118 and 121, and the bar 120. The feed cam 115 is driven in time with the cutter rotation so as to obtain the desired cycle of one revolution of the cutter per rotation of the cam, that is, per reciprocation of the cutter back and forth across the face of the gear blank. The drive to the feed cam is through the gearing 142, 143, 145, 146, 148 and 149 (Figs. 24 and 6).

At the end of each return stroke of the carriage 34, when the gap in the cutter is abreast of the gear blank, the blank is indexed. The cam 170, which is driven in time with the cutter spindle 40 and feed cam 115, operates the index mechanism. When the gap in the cutter rotates abreast of the blank, the cam 170 shifts the shaft 169 (Figs. 24, 17, 16 and 19) forwardly, moving the cam 161 into engagement with the nose 165 of the locking lever 151 which is associated with the work spindle which is at that time at the cutting station. The cam 161 is being rotated all the while in time with the rotation of the feed cam 115 and of the cutter C through the gearing 180, 181, 184, 185, 187, 188, 192, 193, 200, 201, 207 and 168 (Figs. 24, 6, 19 and 17). As the cam 161 continues to rotate in engagement with the nose 165, it causes the locking dog 151 to be disengaged from the index plate 150. At the same instant, the pin 160 which is carried by the cam 161, comes into engagement with a slot 156 of the Geneva wheel 155 which is associated with the work spindle that is at the cutting station. The continued rotation of the cam 161 causes the Geneva wheel to be rotated angularly through the distance between two slots of the Geneva wheel and then the pin 160 rides clear of the Geneva wheel. At the same time, the nose 165 of the locking dog 151 rides down on to the low part of the periphery of the cam 161 and the locking dog 151 drops into engagement with a new notch of the index plate 150 locking the work spindle up again. As soon as the indexing operation is completed, the cam 170 operates to shift the shaft 169 rearwardly withdrawing the cam 161 out of operative position.

The cam 170 is driven in time with the feed cam 115, the cutter C and the drive to the index cam 161 by the worm 196 and worm wheel 197 (Figs. 24, 19 and 18).

The alternate cutting of the tooth spaces of the blank and indexing of the blank proceeds until all of the tooth spaces have been cut in the blank. Then the feed motor 90 of the machine is stopped by operation of the cam lug 402 (Figs. 25, 24 and 7). The gear 399 will at this time through operation of the gear train 390, 391, 394, 395, 398 and 399 (Figs. 6, 7 and 24) have made a complete revolution. The cam 402 shifts the valve 385 to the position shown in Fig. 25, causing the lever 405 to open the limit switch 408, stopping the feed motor 90. The shifting of the valve 385 itself opens the line 415 to supply from the main supply line 410 through the duct 411 and initiates the steps leading to indexing of the turret 76.

The cam 402 is intended to stop the feed motor 90 with the cutter at the end of a return stroke and with the gap in the cutter abreast of the gear blank which has just been cut. In this position, the lug or dog 423 of the lever 422 (Figs. 8 and 25) will ride up on the lobe 421 of the cam 420 and will cause the valve 386 to be shifted to the position shown in Fig. 25 to open the line 430 to supply from the duct 415. If the machine does not stop with the cutter in the correct position, the valve 386 is not shifted and the line 430 remains closed.

During the time that the gear is being cut at the cutting station, the operator will have removed previously-cut gears and chucked new gear blanks on the two work spindles which are at the loading stations. After the operator has chucked a new gear blank G' on the work spindle which is at the upper loading station (Fig. 10), he swings the arm or flag 440 down in front of this blank to pass the arm in front of the blank and be sure that the blank has been chucked properly. After the operator has pulled this flag or arm down, he leaves it down. Thus, the valve 435 will be shifted to the position shown in Fig. 25. After the operator has chucked a new gear blank G'' on the work spindle which is at the other loading station, he will likewise swing the arm or flag 441 down and leave it down. Thus, the valve 436 will be moved to the position shown in Fig. 25.

With the valves 435 and 436 in the positions shown in Fig. 25 and with the valves 385 and 386 moved to the positions shown in this figure, the pressure fluid may flow from the main line 410 through the duct 411, the duct 415, the duct 430, the duct 450, the duct 380 and the duct 492 to the cylinder housing the chuck-control valve 490. This forces this valve 490 to the left to the position shown in Fig. 25 against the resistance of the springs 491. Thus the cylinders 470 which house the pistons 471 are put on exhaust through the lines 480, 481 and 482 and the exhaust duct 497. This permits the springs 87 associated with the chucking mechanisms of the two work spindles which are at the loading stations, to move these two chucking mechanisms to chucking position.

At the same time, the pressure fluid flows from the duct 380 through ports of the pilot valve 360 to the duct 363, forcing the valve 250 downwardly in its cylinder to the position shown in Fig. 25. The pilot valve 360 is at this time in the position shown in Fig. 25 so that the lower end of the valve 250 is on exhaust through the duct 362 and the exhaust duct 368.

With the valve 250 in this position, the pressure fluid flows from the main line 410 through the duct 255, ports 256 and 252 of valve 250, and duct 251 to the left hand end of the piston 240. The right hand end of this piston is simultaneously put on exhaust through the duct 253, the ports 254 and 258 and the exhaust duct 259. This causes the piston 240 to be moved to the right from the position shown in Fig. 25, thus disengaging the locking dog 235 from that notch 236 (Figs. 14 and 25) of the turret with which it has been engaged.

As the piston 240 moves to the right, the pin 371 (Fig. 15) carried by the piston rod 370 of this piston rocks the lever 372 clockwise, causing the pilot valve 361 to be shifted to the left from the position shown in Fig. 25. This puts the line 364 on supply from the line 255 through the duct 359. This causes the valve 310 to be moved upwardly from the position shown in Fig. 25. The upper end of this valve is at this time on exhaust through the duct 365, duct 366 and exhaust duct 368.

With the valve 310 in its upper position, the pressure fluid will flow from the main line 410 through the duct 255, and the ports 319 and 312 of the valve 310, to the line 313. From the line 313, the pressure fluid flows through the duct 352 to the right hand end of the piston 284 forcing the piston to the left to the position shown in Figs. 10 and 25. This causes the piston rod 282 to swing the lever 278 to released position, unclamping the turret 76.

At the same time, the pressure fluid flows from the line 313 through the check valve 323, the duct 326 and the duct 315 to the lower end of the piston 305. This causes the piston 305 to be moved upwardly to rotate the turret through the rack 290, the pinion 291, pawl 295, ratchet wheel 298 and gears 302 and 303 (Figs. 10, 12, 14 and 25).

Figure 26:
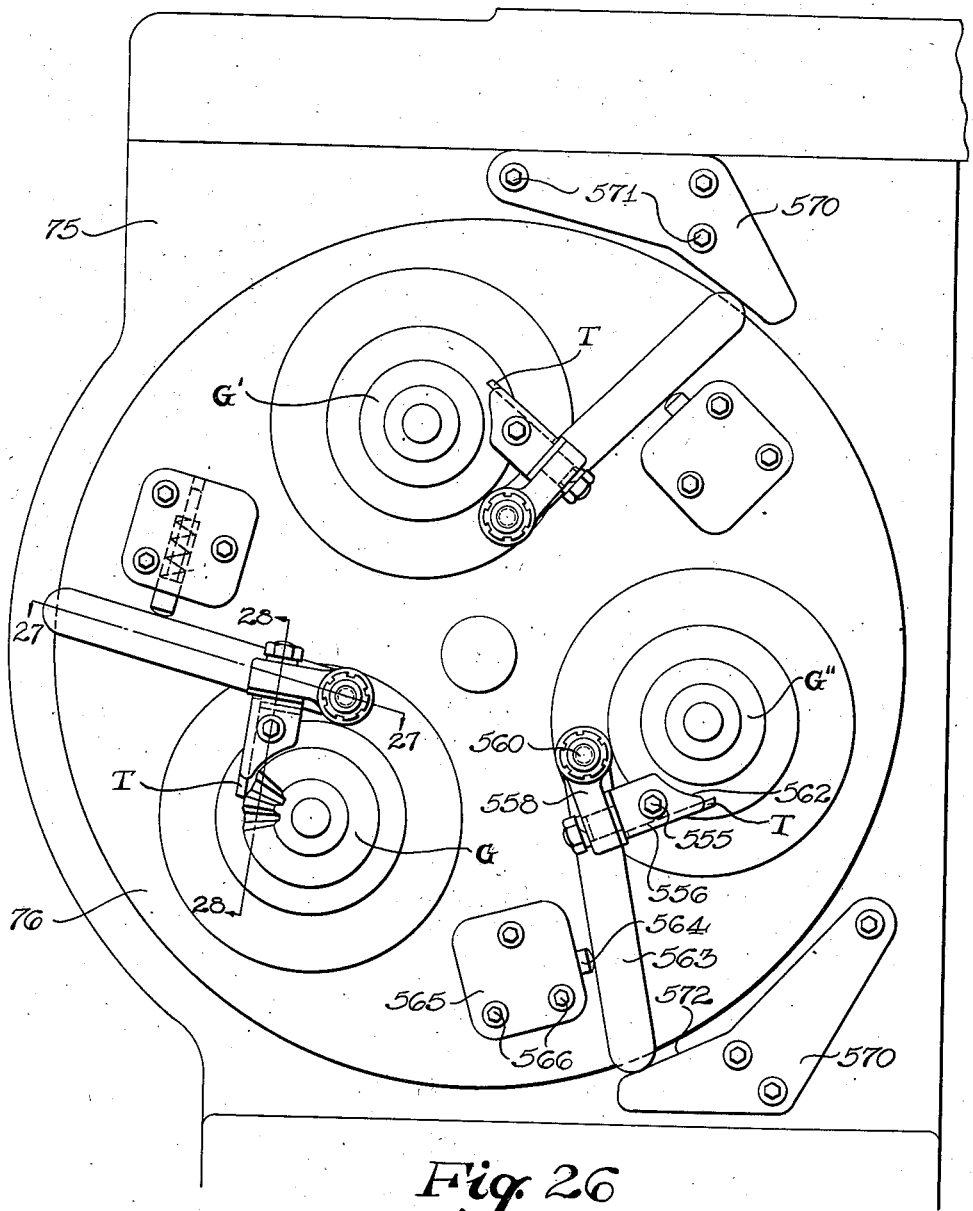
Fig. 26 is a front elevation of the turret of a machine built according to this invention and having burr-removing attachments mounted thereon for removing the burrs produced in the tooth cutting operation.
Figure 29:
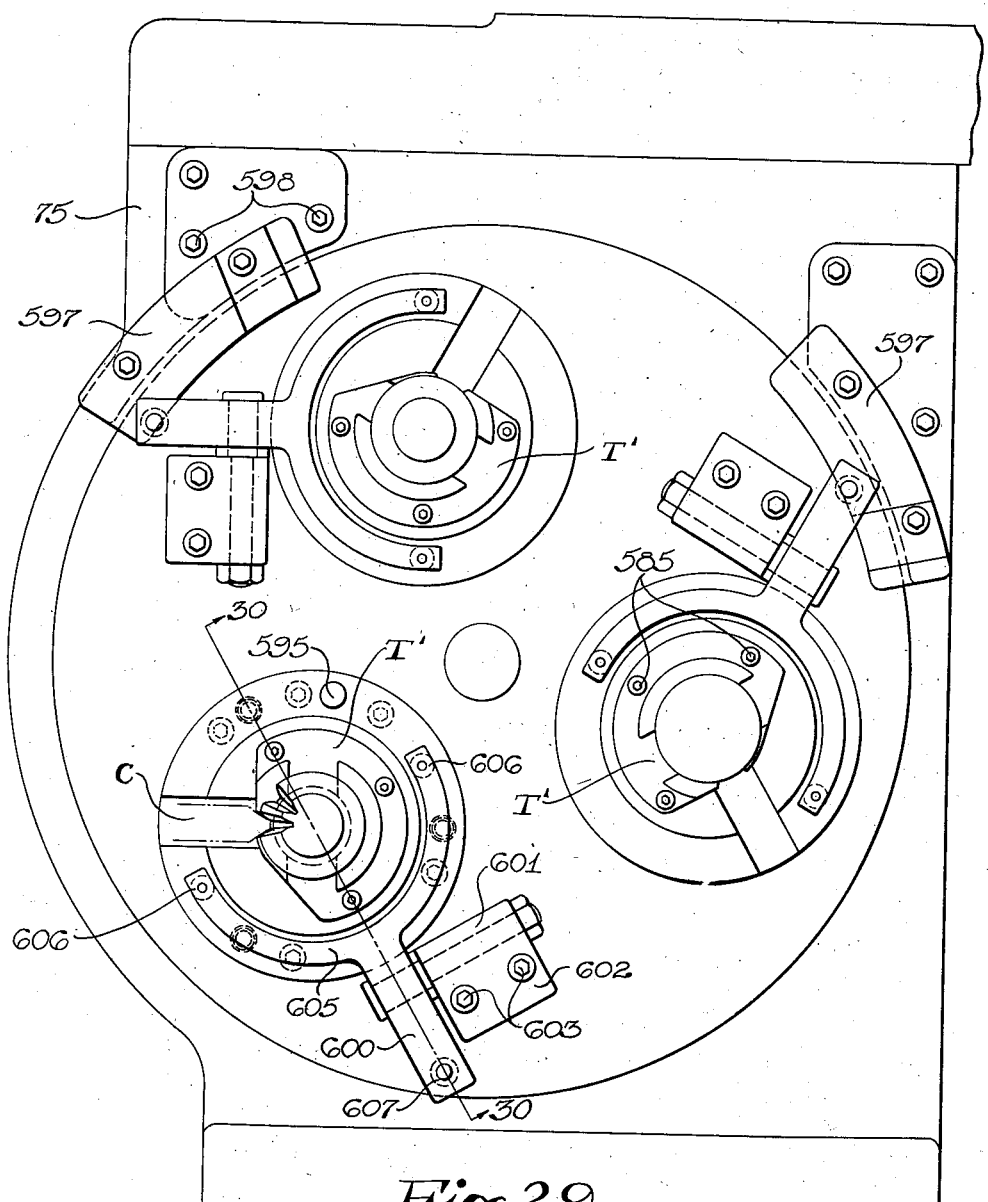
Fig. 29 is a front elevation of the turret of a machine equipped with a modified form of burr-removing attachment.

The motive fluid exhausts from the upper end of the piston 305 through the duct 321, ports 333 and 336 of the throttle valve 335, the ducts 332, 318 and 317, ports 316 and 324 of valve 310 to the exhaust duct 261 which leads back to the sump. As the ratchet wheel 298 rotates, it carries with it the cam 340 (Figs. 13, 26 and 10). This cam rocks the lever 345 to vary the opening of the throttle valve 335 thereby to control the rate of rotation of the turret. The cam 340 is so shaped that the turret will have a slow stop movement, thereby to avoid shocks and vibrations at the end of its indexing rotation.

As the turret rotates, the cam 460 is also rotated through the medium of the gearing 462 and 463 (Figs. 12, 14 and 24), but as the ratio of this gearing is 2 to 1, the gear 463 will be rotated through only a half of revolution in the indexing rotation of the turret so that it will not be until the turret has been indexed twice that the lobe on the cam 460 will come into operative relation with the lever 456. Hence the valves 435 and 436 will still remain in their leftward positions shown in Fig. 25 at the end of the first indexing movement of the turret.

As the turret approaches the end of its indexing movement, the pin 375 (Figs. 13, 14 and 25) will strike the lever 376 to rock this lever counterclockwise from the position shown in Fig. 25 and shift the pilot valve 360 to the right from the position shown in Fig. 25. This will put the duct 362 on supply from the duct 380. Thus the valve 250 will be moved upwardly from the position shown in Fig. 25, and the motive fluid will be exhausted from the upper end of this valve through the ducts 363 and 369.

When the valve 250 is moved to its upper position, the pressure fluid will flow from the supply duct 255 through the duct 253 to the right hand end of the piston 240 to move the turret locking dog 235 back into locking engagement with the turret and this dog will drop into engagement with a notch 236 of the turret which is spaced 120° from the notch 236 with which the dog was previously engaged. The indexing of the turret will now have been completed. It will have moved through an angle of 120° to bring the gear blank G' into cutting position and move the now finished gear G to the lower loading station.

The turret indexing mechanism is now reset. As the piston 240 moves to the left, the pin 371 carried by the piston rod 370 again rocks the lever 372 (Fig. 15). This lever is now swung back to the position shown in Fig. 25, causing the pilot valve 361 to be moved back to the position shown in Fig. 25. The pressure fluid now flows from the line 255 through the duct 359 and duct 365 to the valve 310 to move this valve down to the position shown in Fig. 25. At the same time, the lower end of the valve 310 is put on exhaust through the ducts 364, 367 and exhaust duct 369. The return of the valve 310 to the position shown in Fig. 25 causes the duct 317 to be put on supply from the main duct 255 through the ports 313 and 316. The pressure fluid then flows from the duct 317 through the line 350 to the left hand end of the piston 284 (Figs. 10 and 25). This causes the lever 278 to be rocked to clamping position to clamp the turret. At the same time, the pressure fluid flows through the line 318, the duct 322 and duct 321 to the upper end of the piston 305. This causes the piston 305 to be moved downwardly to the position shown in Fig. 25. At this time the lower end of the cylinder 360 is on exhaust through the duct 315, the needle valve 327, the line 313, the ports 312 and 322 of valve 310, and exhaust duct 259.

There is an elongated cam-rail 535 secured to one side of the rack 290 (Fig. 12). A dog 537 which is pivotally mounted in one end of a plunger 536 is adapted to ride on this cam-rail 535. The plunger engages at its opposite end with the roller 538 of a normally-open limit switch 540. This limit switch is wired into the starting circuit of the drive motor 90. The dog 537 is resiliently held against movement in one direction about its pivot by a spring 541.

When the rack 290 moves upwardly, indexing the turret, the dog 537 is rocked about its pivot against the resistance of the spring 541 and the left end of the plunger 536 rides on the cam-rail 535. Toward the end of the upward movement of the rack 290, however, the plunger rides down off of the beveled lower-end of the cam-rail.

When the rack 290 moves downwardly again, the dog 537 rides up on the cam rail, forcing the plunger 536 to the right from the position shown in Fig. 12 to close the normally open limit switch 540. This closes the circuit to the feed drive motor 90, restarting the cutting mechanism of the machine.

A new blank is now at the cutting station and this blank is cut in the same way as previously described. The cutter rotates on its axis and is simultaneously fed back and forth across the face of the gear blank. At the end of each return stroke, the blank is indexed.

During the downward movement of the rack 290, no rotation is imparted to the turret. The pawl 295 (Figs. 13 and 12) simply idles back over the one-tooth ratchet wheel 293. At the end of the downward movement of the rack 290, the dog 537 rides off of the upper end of the cam rail 535, resuming again the position shown in Fig. 12 and the limit switch 540 again opens.

When the feed motor 90 is restarted, the roller 403 rides down off of the cam 402 (Fig. 25) and the dog 423 rides off of the lobe of the cam 420. Thus the valves 385 and 386 are moved downwardly from the positions shown in Fig. 25.

When the valve 385 moves downwardly, it allows the normally closed limit switch 408 to close so that the circuit to the drive motor 90 is maintained even after the limit switch 540 is reopened.

When the valve 385 moves to its downward position, the line 529 is also put on supply from the pressure duct 411. This causes the piston 526 (Figs. 20 and 25) to be moved to the left from the position shown in Fig. 25. This causes the ratchet and pawl mechanism 523, 522 (Figs. 20 to 23 inclusive) to advance the chip conveyer one step. At this time, the motive fluid exhausts from the left hand end of the piston 526 through the duct 528, ducts 430 and 419. The pawl 523 is reset again at the end of the next cutting cycle of the machine when the roller 403 of cam 385 again rides up on cam 402 of gear 399.

The alternate cutting and indexing of the new gear blank at the cutting station proceeds in the same way as previously described until a new gear has been finished. Then the feed motor 90 is stopped as before and the piston 240 is shifted as before to unlock the turret. The indexing of the turret proceeds in the same manner as previously described. The only difference is that in this second indexing movement of the turret, the gear 463 (Figs. 14 and 25) will be rotated through another half revolution which is far enough to bring the lobe of the cam 460 into engagement with the locking levers 456 to rock the same in a clockwise direction about their pivots 457 and release the yoke members 443 and 446. This permits the springs 444 to shift the valves 435 and 436 to the right from the positions shown in Fig. 25. Thus, the duct 492 is put on exhaust and allows the spring 491 to shift the chuck-control valve 490 to the right from the position shown in Fig. 25. This causes the ducts 480 and 481 which lead to the cylinders 470 to be put on supply from the main duct 255 through the duct 495, ducts 482, 480 and 481. The pistons 471 are, therefore, moved rearwardly in their cylinders 470 to release the two chucking mechanisms of the two work spindles that are now at the loading station. The operator may, therefore, remove the completed gear blanks from the two spindles which are at the loading stations and chuck new blanks thereon. When the operator has placed a blank on each spindle, he tests the chucking of the blank and assures himself that the blank is properly chucked by swinging the two arms 440 and 441 down in front of the blanks and he leaves them there. The swinging of these arms down resets the valves 435 and 436 to the position shown in Fig. 25 so that the further automatic operation of the machine may proceed as above described.

A start and stop button is, of course, provided at a convenient point in the machine as indicated at 550 in Fig. 1, so that the machine may be stopped at any time and restarted again. Otherwise, however, the machine will operate automatically once it is started provided the operator keeps the work spindles, which are at the loading stations, loaded and removes the completed gears therefrom in proper time.

Burr-removing attachment

It has been found in practice that a burr is formed at one end of each tooth space of the gear by the cutting tool C. These burrs can be removed manually with a file after a gear is removed from the machine or they can be removed in a special burr-removing apparatus. We have devised means, however, whereby the burrs may be removed automatically on a gear cutting machine constructed according to this invention immediately after they are formed and without any separate operation. Thereby, separate burr-removing operations and the additional handling required therefor are eliminated. Time is saved and the cost of producing a gear is kept at a minimum.

In the accompanying drawings, there are shown two forms of burr-removing attachments which may be used on the gear cutting machine of the present invention. The embodiment illustrated in Figs. 26 to 28 inclusive will be described first.

The gear blank, which is at the cutting station, is again denoted at G and the gear blanks, which are at the loading stations, are again denoted at G' and G'', respectively. The turret 76 and all the parts for operating the same may be identical with the construction already described. The burr-removing attachments are simply secured to the face of the turret.

There is one burr-removing attachment associated with each work spindle. Each burr-removing attachment carries a chisel-like burr-cutting tool T which is sharpened to have a cutting edge at one end. The burr-removing attachments associated with the three work spindles are identical in construction and one only need be described in detail.

Each burr-cutting tool T is secured by a screw 555 in a tool holder 556 of the split-clamp type. This tool holder 556 is provided with an integral stud that fits into a hole 557 formed in a supporting member 558. The tool holder is secured to the supporting member 558 by a screw 559.

The supporting member is pivotally mounted upon a post 560. The posts 560 are secured to the front face of the work-turret 76.

The free end of each tool holder 556 is shaped, as clearly shown in Fig. 26, to conform to the shape of the back-cone of the gear to be cut. In the illustrated embodiment, the free-end of each tool holder 556 is cut away on a circular arc as indicated at 562. Each supporting member 558 is formed with an integral arm 563. A spring-pressed plunger 564 presses against one side of each of the arms 563 to resiliently urge and hold each cutting tool in operative engagement with the back-cone surface of a gear blank. The plungers 564 are housed in blocks 565 which are secured by screws 566 to the face of the turret 76.

Since the burrs are only formed in the tooth cutting operation, only that burring attachment is required at any time to be in operative position which is associated with the work spindle that is at the cutting station. To hold the two burring attachments, which are associated with the work spindles that are at the loading stations, out of operative positions, two cams 570 are provided. These cams are identical in construction. They are secured to the face of the turret housing 75 by screws 571. Each cam 570 is formed with a cam surface 572. When the turret 76 is indexed to move a work spindle and its associated burring attachment to either of the loading stations, the end of the arm 563 of the burring attachment rides up on the cam surface 572 of one of the cams 570. This causes the associated supporting member 558 to be rocked about its pivot stud 560 against the resistance of the spring plunger 564 and the associated burring tool T is held out of operative position. There is no cam 570, however, at the cutting station and when a burr-removing attachment is at the cutting station, therefore, it is held in operative position by the associated spring-pressed plunger 564.

The cutting tool C forms a burr at the large ends of the tooth spaces of bevel gears when the tool travels on its forward stroke from the small end to the large end of the tooth space as is the case in the machine illustrated. Each burring tool T, therefore, is positioned to operate at the large ends of the gear teeth. Further than this, the burring attachments are so located that as a gear blank is indexed, the tooth space, that has just been cut, is indexed into the burring tool T. Further than this, the burring tool is so positioned that the indexing rotation of the gear blank will cause the burring tool to sweep along the back cone surface of the gear and remove the burr which has just previously been formed.

The burring tool is held resiliently up against the back cone surface of the gear blank and the burr removing operation is performed by the indexing rotation of the gear blank under this resiliently held burring tool. Thus, no actuating drive to the burr removing attachment itself is required. The burr is removed immediately after each tooth space is cut and when the gear blank has been finished, no extra burr removing operation is required.

The burr-removing attachment illustrated in Figs. 29 to 32 inclusive is somewhat different in form from that just described but similar in principle of operation. Again there is a burr-removing attachment associated with each work spindle and again the burr-removing attachments are held out of operative positions while they are at the loading stations and only that burr removing attachment is operative which is at the cutting station. Again the burr removing attachments are secured to the face of the work turret and again the burr cutting movement is effected by the indexing of the gear blank which is at the cutting station.

In the modification of the invention illustrated in Figs. 29 to 32 inclusive, the burr-removing tools are denoted at T'. The tools are identical and so are the burring attachments and only one will therefore be described.

The tools T' are in the form of hollow face-mills. Each tool is shaped, as clearly shown in Fig. 30, to be mounted over and to surround a work collet 85. Each tool is secured by screws 585 to a hollow tool holder or supporting member 586 that is also shaped to fit over and surround the work collet 85.

The tools T' are especially suitable for removing burrs from gears or pinions having back surfaces 587 of spherical shape, as does the pinion P shown in Fig. 30. For this purpose, the end face of the tool T' is ground to a complementary spherical shape as denoted at 588 in Fig. 32.

The ring from which the cutting tool T' is formed is slotted through as denoted at 590. The slot 590 has two functions. It forms a cutting edge 591 at its juncture with the spherical surface 588 of the tool. It also provides room for the cutter C to reach in and cut the tooth spaces of the gear blank at the cutting station.

Each tool is also recessed at two diametrically opposed points as indicated at 592 and 593. These recesses are formed with rounded bottoms as indicated at 594 in Fig. 32. These recesses are to permit the operator of the machine to reach in with his fingers behind a gear so as to remove it from the work spindle at the loading station after its teeth have been cut. Each tool holder 586 is held on the turret by a pin 595 and between each tool holder and the front face of the turret, there is interposed a plurality of coil springs 596. The springs 596 serve to urge the tool T' outwardly and hold its cutting edge against the back of the pinion blank P with which it is associated. Since the tool is only required to be in operative position, however, at the cutting station, means is provided for holding two of the tools T' out of operative position when they are at the loading stations. For this purpose two cam rails 597 are provided. These are identical with one another. They are secured to the front face of the turret housing 75 opposite the loading stations by screws 598.

Associated with each of the burring attachments is a lever 600. This lever is pivotally mounted upon a pin 601 that is journaled in a block or lug 602 which is secured by screws 603 to the front face of the turret. The lever 600 is formed at one end with a semi-circular arm 605. There are two contact members 606 carried in the extremities of the arm 605. These two contact members bear against the outer face of the associated tool holder 586. There is a contact member 607 carried in the opposite end of the lever 600.

As each work spindle is indexed, by rotation of the turret, to a loading station, the contact member 607, that is carried by the lever 600, which is associated with that work spindle, rides on the top of one of the cam rails 597. This causes the lever 600 to be rocked about its pivot 601 to force the tool holder 586 and associated tool T' rearwardly to retract the tool T' from operative position. There is no cam rail 597, however, at the cutting station. Hence the springs 596 are operative to hold each cutting tool T', when it is at the cutting station, in operative position.

As in the previously described embodiment, each burring tool T' is positioned so that its cutting edge will, when the tool is at the cutting station, lie at one side of the tooth space which is to be cut by the cutting tool C. Moreover, each tool T' is positioned so that when the gear blank is indexed, after a tooth space has been cut, the indexing rotation will carry it toward and under the burring tool so as to remove the burr from the end of the tooth space.

While the invention has been described in connection with a machine for cutting bevel gears, it will be understood that the invention applies to the cutting of other types of gears also. It will further be understood that while the invention has been illustrated in connection with a particular embodiment thereof, that the invention is capable of further modification and that this application is intended to cover any variations, uses, or adaptations of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described our invention, what we claim is:

1. In a gear cutting machine, a work support, a rotary cutter having a plurality of cutting blades arranged radially part-way only around its periphery with a gap between the last and first blades, means for rotating the cutter, means for moving the cutter longitudinally of a tooth space to be cut in time with the cutter rotation so that different blades of the cutter cut at different points along the length of the tooth space during a revolution of the cutter, means for holding the work support against rotation while the cutter is taking its cuts, and means driven in time with the rotation of the cutter for indexing the work support when the gap in the cutter is abreast of the work.

2. In a gear cutting machine, a work support, a rotary cutter having a plurality of roughing blades followed by a plurality of finishing blades arranged part-way only around its periphery with a gap between the last and first blades, means for rotating the cutter, means for reciprocating the cutter in time with its rotation to move the cutter forward and back along the length of a tooth space to be cut once per revolution of the cutter so that the roughing blades cut on the forward stroke and the finishing blades on the return stroke, means for holding the work support against rotation while the cutter is in engagement with the work, and means driven in time with the rotation of the cutter for indexing the work support on the return stroke of the cutter when the gap in the cutter is abreast of the work.

3. In a gear cutting machine, a work support, a rotary cutter having a plurality of cutting blades arranged part-way only around its periphery with a gap between the last and first blades, a carriage on which one of said parts is mounted, a cam for reciprocating said carriage formed to effect a complete reciprocatory movement of the carriage on each revolution thereby to move the cutter back and forth across the face of a gear blank once on each revolution of the cutter, means for rotating the cutter, means for rotating the cam once for each revolution of the cutter, means for holding the work support against rotation while the cutter is cutting, and means driven in time with the rotation of the cutter for indexing the work support when the gap in the cutter is abreast of the work.

4. In a gear cutting machine, a tool, a plurality of work spindles, a rotary turret in which the work spindles are journaled, means for rotating the turret to move the work spindles successively from loading position to cutting position, a burr-removing tool associated with each work spindle, means for holding the corresponding burr-removing tool out of operative position when a work spindle is at the loading station, and means for moving the burr-removing tool into operative position when a work spindle reaches the cutting station.

5. In a gear cutting machine, the combination with a work spindle, a tool for cutting tooth spaces in the work piece and means for indexing the work piece, of a burr-removing tool mounted coaxially of the work spindle in position to engage one end face of the work piece, and means for holding said burr-removing tool resiliently against said end face of the work piece whereby indexing rotation of the work spindle may cause the burr-removing tool to remove burrs, which are formed by the cutting tool, from the work piece.

6. In a gear cutting machine, a tool, means for actuating said tool, a plurality of work spindles, a rotary turret in which the work spindles are journaled, fluid-pressure operated means for rotating the turret periodically to move the work spindles successively from loading to cutting position, means for indexing each work spindle periodically when it is in cutting position, means operated in time with said indexing means to stop said tool and render the turret-rotating means operative, and means operated by the turret-rotating means for making the tool actuating means operative again when the indexing movement of the turret has been completed.

7. In a gear cutting machine, a tool, a plurality of work spindles, a turret in which the work spindles are journaled, fluid-pressure operated means for rotating the turret periodically to move each work spindle successively from loading to cutting position, means for moving the tool relative to the work piece, which is at the cutting station, to cut the tooth spaces of such work piece, a pair of valves for controlling the operation of the fluid-pressure operated means, means whereby operation of one of said valves is determined by the number of tooth spaces to be cut in a work piece, and means whereby operation of the other valve is controlled from the position of the tool in its movement.

8. In a gear cutting machine, a tool, a plurality of work spindles, a turret in which the work spindles are journaled, fluid-pressure operated means for rotating the turret periodically to move the work spindles successively from loading to cutting position, a throttle valve for controlling the speed of rotation of the turret, and a rotary cam for controlling the opening of said throttle valve, and means for rotating said cam on rotation of the turret.

9. In a machine for producing gears, a tool, a rotary turret, a plurality for work spindles journaled in the turret, means for rotating the turret comprising a reciprocable piston, a rack secured thereto, gearing connecting the rack to the turret, and means for applying fluid pressure selectively to opposite sides of the piston, and means for controlling the speed of rotation of said turret comprising a throttle valve, a rotary cam for controlling the opening of said throttle valve, and means operatively connecting the throttle valve with said rack whereby movement of the rack rotates the cam.

10. In a machine for cutting gears, a tool, a plurality of work spindles, a turret in which the work spindles are journaled, said work spindles being so mounted in the turret that when one work spindle is at the cutting station, a plurality of work spindles are at loading stations, means for periodically indexing the turret to move the work spindles successively from one loading station to another and then to the cutting station, chucking mechanism for securing a work piece to each work spindle, means operable after a predetermined number of indexing operations of the turret to release simultaneously the several chucking mechanisms of the plurality of work spindles which are at the loading stations, and means preventing further indexing of the turret until work pieces have been again chucked on said work spindles.

11. In a gear cutting machine, a tool, a rotary turret, a plurality of work spindles journaled in the turret and so mounted therein that when one of the work spindles is at the cutting station, the other work spindles are at loading stations, means for periodically indexing the turret to move the work spindles successively from one loading station to another and then to the cutting station, chucking mechanisms for securing a work piece to each work spindle, a rotary cam, means for driving the cam through part of a revolution on each indexing movement of the turret, and means operatively connecting the cam to the chucking mechanisms to release simultaneously the chucking mechanisms of all the work spindles, which are at the loading stations, when the cam has made a complete revolution.

12. In a gear cutting machine, a cutting tool, a rotary turret, a plurality of work spindles journaled in the turret and so mounted therein that when one work spindle is at the cutting station, the other work spindles are at loading stations, means for periodically indexing the turret to move the work spindles successively from one loading station to another and then to the cutting station, chucking mechanism for securing a work piece to each work spindle, a rotary cam, means for driving the cam through part of a revolution on each indexing movement of the turret, means operatively connecting the cam to the chucking mechanisms to release simultaneously the chucking mechanisms of all the work spindles, which are at the loading stations, when the cam has made a complete revolution, and means for thereafter preventing rotation of the turret until new work pieces have been properly placed on said work spindles again.

13. In a gear cutting machine, a tool, a rotary turret, a plurality of work spindles journaled in the turret and so mounted therein that when one work spindle is at the cutting station, the other work spindles are at loading stations, fluid pressure operated means for periodically indexing the turret to move the work spindles successively from one loading station to another and then to the cutting station, chucking mechanisms for securing a work piece to each work spindle, fluid pressure operated means for releasing said chucking mechanisms, valves for controlling said chuck releasing mechanisms, said valves being operatively incorporated in the lines of the fluid pressure operated means for indexing the turret to prevent indexing of the turret when the chucking mechanisms are released, means for moving the valves to chuck releasing positions after a plurality of indexing movements of the turret, a testing member at each loading station to test whether the work piece has been chucked properly, and means operatively connecting said testing members to said valves to return the same to chuck-engaged position if the testing members in their testing movements show that work pieces have been chucked properly at the loading stations.

14. In a machine for cutting gears, a tool, a plurality of work spindles, a turret in which the work spindles are journaled, said work spindles being so mounted on the turret that when one spindle is at the cutting station, a plurality of spindles are at the loading stations, means for periodically indexing the turret to move the work spindles successively from one loading station to another and then to the cutting station, chucking mechanism for securing a work piece to each work spindle, means at each loading station to test whether a blank has been properly chucked on the work spindle, and means preventing indexing of the turret until the several testing means indicate that the blanks have properly been chucked at all the loading stations.

15. In a machine for cutting gears, a tool, a plurality of work spindles, a turret in which the work spindles are journaled, said work spindles being so mounted on the turret that when one work spindle is at the cutting station, a plurality of work spindles are at loading stations, means for periodically indexing the turret to move the work spindles successively from one loading station to another and then to the cutting station, chucking mechanism for securing a work piece to each work spindle, a member at each loading station which is adapted to be moved into position to test whether a blank has been properly chucked on the work spindle which is at that loading station, means preventing rotation of the turret until said several testing members are in testing position at all the loading stations, and means for automatically returning said testing members to inoperative position periodically each time that the turret has been indexed as many times as there are loading stations.

16. In a gear cutting machine, a work support, a rotary disc cutter having a plurality of cutting blades which are adapted to cut, respectively, at different points along the length of a gear tooth, means for rotating the cutter, means for moving the cutter lengthwise of the tooth surface of the work in time with the cutter rotation so that the different blades of the cutter cut at different points along the length of a tooth space during a revolution of the cutter, means for holding the work support against rotation while the cutter is cutting, and means driven in time with the cutter rotation for periodically indexing the work.

17. In a machine for producing gears, a tool, a frame, a work holder movably mounted on the frame, a plurality of work supports mounted in said holder, means for indexing the work holder to move the work supports successively from operating to loading positions, chucking mechanism for each work holder, a plurality of chuck-releasing mechanisms mounted on the frame in position to register with a plurality of the chucking mechanisms when the work supports with which the chucking mechanisms are associated are at loading positions, and means for periodically actuating said chuck-releasing means to release simultaneously the chucking mechanisms of the work supports which are at loading positions.

18. In a machine for producing gears, a cutting tool, means for actuating the tool, a rotary turret, a plurality of work spindles journaled in the turret, fluid pressure operated means for indexing the turret periodically to move the work spindles successively from a loading station to the cutting station, means for periodically indexing each work spindle when it is at the cutting station, a pair of valves normally preventing operation of said fluid pressure operated means, a cam driven in time with the tool actuating means for tripping one of said valves, and a cam driven in time with the work spindle indexing mechanism for tripping the other of said valves when the cutting operations on a work piece are completed.

19. In a machine for producing gears, a tool, a plurality of work spindles, a rotary turret in which the work spindles are journaled, a housing in which the turret is journaled, means for rotating the turret to move the work spindles successively from a loading station to the cutting station, a burr-removing tool associated with each work spindle, means for holding the burr-removing tools resiliently against one end face of the work pieces whereby rotation of each work spindle may cause the burr-removing tool associated therewith to remove from the work piece mounted on the spindle the burrs which are formed in the cutting operation, and stationary cams mounted on the housing at all except the cutting station to hold the burr-removing tools out of engagement with the work pieces at all except the cutting station.

20. In a machine for producing bevel gears, a frame, a slide reciprocably mounted on the frame, a rotary disc cutter journaled in the slide, means for rotating the cutter, means for reciprocating the slide to move the cutter lengthwise of the tooth spaces of the gear to be cut, a base mounted on the frame and having an inclined upper face, a plate mounted on the base and having a lower inclined face complementary to the upper face of the base, a work head mounted on the plate for angular adjustment thereon to position the work in accordance with the cone angle of the gear to be produced, a work spindle journaled in the work head, and means for adjusting the plate on the base to determine the vertical position of the axis of the work spindle relative to the plane of rotation of the cutter.

21. In a machine for producing gears, a rotary turret, a plurality of work spindles journaled in the turret, a notched index plate secured to each work spindle, a plurality of locking dogs movably mounted in the turret, one of which is associated with each index plate to hold the corresponding work spindle against rotation, means for periodically indexing the turret to move the work spindles successively from a loading station to the cutting station, and means at the cutting station for periodically disengaging the lock dog, which is associated with the work spindle that is at the cutting station, and rotating that work spindle to effect indexing of the same.

22. In a gear cutting machine, a tool, a rotary turret, a plurality of work spindles journaled in the turret, fluid pressure operated means for periodically indexing the turret comprising a cylinder and a piston reciprocable therein, means for holding the turret against rotation during cutting comprising a locking dog which is adapted to be engaged with the turret, means for moving the locking dog to and from operative position comprising a cylinder and a piston reciprocable therein, a pair of reverse valves controlling, respectively, the directions of application of fluid pressure to said pistons, means operable at opposite limits of the movements of the first piston for reversing the valve which controls the direction of application of fluid pressure to the second piston, and means operable at opposite limits of movement of the second piston for reversing the valve which controls the direction of application of fluid pressure to the first piston.

23. In a machine for producing gears, a frame, a slide reciprocable on the frame, a rotary disc cutter journaled in the slide, a turret, a plurality of work spindles journaled in the turret, fluid pressure operated means for periodically indexing the turret to move the work spindles successively from a loading station to a cutting station, means for indexing each work spindle periodically when it is at the cutting station, means for rotating the cutter, means for reciprocating the slide to move the cutter lengthwise of a tooth space to be cut, means operatively connected to the mechanism for reciprocating the slide to prevent operation of the turret indexing mechanism until the slide as at one end of its stroke, means driven in time with the reciprocation of the slide which prevents operation of the turret indexing mechanism until all of the tooth spaces of a blank have been cut, and means operatively connected to the last named means for stopping the movements of the tool slide during indexing of the turret.

24. In a machine for producing gears, a frame, a slide reciprocable on the frame, a rotary disc cutter journaled in the slide, a turret, a plurality of work spindles journaled in the turret, fluid pressure operated means for periodically indexing the turret to move the work spindles successively from a loading station to the cutting station, means for indexing each work spindle periodically when it is at the cutting station, means for rotating the cutter, means for reciprocating the slide to move the cutter lengthwise of a tooth space to be cut, means operatively connected to the mechanism for reciprocating the slide to prevent operation of the turret indexing mechanism until the slide is at one end of its stroke, means driven in time with the reciprocations of the slide which prevents operation of the turret indexing mechanism until all of the tooth spaces of a blank have been cut, means operatively connected to the last named means for stopping the movements of the slide during indexing of the turret, and means operatively connected to the turret indexing mechanism to prevent reciprocation of the tool slide until indexing of the turret has been completed.

25. In a gear cutting machine, a work support, a tool support, a slide on which one of said supports is mounted, a rotary disc cutter journaled in the tool support and having cutting blades arranged part way only around its periphery with a gap between the last and first blades, a work spindle journaled in the work support, a notched index plate secured to the work spindle, a locking dog engaging said plate to hold the work spindle against rotation during cutting, and means periodically operative at one end of the stroke of the slide for disengaging said dog and rotating the work spindle to index the work spindle when the gap in the cutter is abreast of the blank.

ERNEST WILDHABER.
CLARENCE T. GALLOWAY.